US007987117B2

(12) United States Patent
Mozley et al.

(10) Patent No.: US 7,987,117 B2
(45) Date of Patent: Jul. 26, 2011

(54) SYSTEM AND METHOD FOR PROVIDING AN AUCTION OF REAL ESTATE

(75) Inventors: Mark Mozley, Woodstock, GA (US); Bill Pelfrey, Chattanooga, TN (US); Jennifer Pelfrey, Marietta, GA (US); Donna Ames, White, GA (US); Tony Fisher, Marietta, GA (US); Christina Reed, Jasper, GA (US)

(73) Assignee: zugbugauctions.com, LLC, Canton, GA (US)

( * ) Notice: Subject to any disclaimer, the term of this patent is extended or adjusted under 35 U.S.C. 154(b) by 1345 days.

(21) Appl. No.: 10/060,851

(22) Filed: Jan. 29, 2002

(65) Prior Publication Data

US 2002/0123959 A1    Sep. 5, 2002

Related U.S. Application Data

(60) Provisional application No. 60/265,144, filed on Jan. 29, 2001, provisional application No. 60/286,824, filed on Apr. 27, 2001.

(51) Int. Cl.
    *G06Q 30/00*    (2006.01)
(52) U.S. Cl. .................................. 705/26.1; 705/35
(58) Field of Classification Search .................. 705/26, 705/37
    See application file for complete search history.

(56) References Cited

U.S. PATENT DOCUMENTS

| 6,243,691 B1 | 6/2001 | Fisher et al. ...................... 705/37 |
| 6,684,196 B1 * | 1/2004 | Mini et al. ........................ 705/26 |
| 7,333,943 B1 * | 2/2008 | Charuk et al. ..................... 705/26 |
| 2002/0023050 A1 | 2/2002 | Wakabayashi ..................... 705/37 |
| 2002/0069151 A1 | 6/2002 | Casper ................................ 705/37 |
| 2002/0138485 A1 * | 9/2002 | Faudman ............................ 707/9 |

FOREIGN PATENT DOCUMENTS

| JP | 11059399 | | 3/1999 |
| JP | 200282551 | | 9/2000 |
| JP | 2000259744 A | * | 9/2000 |
| KR | 2001110836 | * | 6/2000 |

OTHER PUBLICATIONS

"Zugbugauctions.com Signs Exclusive Agreement With M2Verticom Corporation—Empowering Consumers with a Cost Effective Wireless Real Estate Solution," Business Wire. Monday, Nov. 27, 2000.*

(Continued)

*Primary Examiner* — Jagdish N Patel
*Assistant Examiner* — Sara Chandler
(74) *Attorney, Agent, or Firm* — Thomas, Kayden, Horstemeyer & Risley, LLP

(57) ABSTRACT

The present invention provides a system and method for providing a real estate auction system. In architecture, the system includes a server device on a network comprising a mechanism for posting a real estate property for auction, a mechanism for acquiring a plurality of data items describing the real estate property for auction from a seller remote device, a mechanism or making the real estate property available at auction to a bidder remote device; and a mechanism for accepting a bid on the real estate property for auction from at least one potential buyer for a predetermined period. The present invention can also be viewed as a method for providing a real estate auction. The method operates by (1) posting a real estate property for auction; (2) acquiring a plurality of data items describing the real estate property for auction; (3) making the real estate property available at auction; and (4) accepting a bid on the real estate property for auction from at least one potential buyer for a predetermined period.

36 Claims, 38 Drawing Sheets

OTHER PUBLICATIONS

"Access Developers Enters On-line Real Estate Business," Business Editors. Business Wire. New York: Aug. 4, 1999. p. 1.*

"Appraisal.com Finds More Online Partners," Mortgage Servicing News, v. 5, n. 3, p. 24. Mar. 2001.*

"Companies: Ebay Acquires Auction Site for Real Estate—HomesDirect Specializes in Foreclosed Properties," by Nick Wingfield. Wall Street Journal (Europe). Brussels. Aug. 8, 2001. p. 5.*

"Ebay-Homeseekers.com Deal Aimed at Agents, Shoppers." Newsbytes News Network, p. N/A. Nov. 9, 2000.*

"Homebid.com Unveils New Line of Online Real Estate Application Services at Real Estate Connect 2000," Business Wire. Wednesday, Feb. 23, 2000.*

"House Auctions Gain Favor in an eBay World," by David W. Chen. New York Times. (Late Edition (East Coast)). New York, NY: Jun. 23, 2000. p. A.1.*

"Kennedy-Wilson Close to Launching First Commercial Real Estate Auction Site," by Blanche Evans. Published: May 11, 1999.*

"Kennedy-Wilson Launches eProperty.com: The New Online Real Estate Site Goes Live: Aims To Change the Way Real Estate is Bought and Sold." Business Wire. Thursday, Oct. 14, 1999.*

"Realtytrac.com Launches the Web's Largest Database of Foreclosure Properties," Business Wire. Tuesday, Jul. 25, 2000.*

"The future of the residential real estate brokerage industry," by Jud, G Donald and Stephen Roulac. Real Estate Issues. v26 n2. pp. 22-30.*

"Home Auctions Expected to Transform the Real Estate Industry," by Blanche Evans. Published: May 4, 1999.*

"Rbuy launches first broker-controlled auction site," by Anonymous. Grand Rapids Business Journal. Grand Rapids: Jul. 26, 1999. vol. 17, Iss. 30, p. 20.*

"Kennedy Wilson Launches eProperty.com," by Blanche Evans. Published: Oct. 21, 1999.*

* cited by examiner

280 →

281

WHAT IT COSTS?

ZUGBUGAUCTIONS.COM ("ZBA") CHARGES A LOW, UP-FRONT FEE TO POST A PROPERTY ON THE ZBA AUCTION VENUE. THE FEES ARE AS FOLLOWS:

RESIDENTIAL FEES
1) POSTING FEE $399.00 2,4,6 WEEK PREVIEW AND 2 WEEK AUCTION
2) RE-POSTING FEE $59.00 2 WEEK PREVIEW AND 2 WEEK AUCTION

THESE FEES ARE FOR ONE AUCTION PREVIEW PERIOD (DETERMINED BY THE SELLER) AND A 2-WEEK AUCTION WHERE BIDDERS WILL BID ON PROPERTIES. THESE FEES MUST BE PAID BEFORE A PROPERTY CAN BE POSTED AND A PREVIEW PERIOD AND AUCTION CAN BEGIN.

COMMERCIAL FEES
1) POSTING FEE $699.00 2,4,6 WEEK PREVIEW AND 6 MONTH AUCTION
2) RE-POSTING FEE $99.00 2 WEEK PREVIEW AND 6 MONTH AUCTION

WITH ANY PROPERTY YOU WILL HAVE A ROLLING 6-MONTH AUCTION FORMAT WITH TWO WEEKS PREVIEW AND TWO WEEKS LIVE AUCTION. DURING THE TWO-WEEK PREVIEW YOU CAN ADJUST YOUR RESERVE PRICE AND SUBMIT ANY ADDITIONAL DATA CHANGES.

IF YOUR PROPERTY DOES NOT SELL DURING THE INITIAL AUCTION PERIOD, YOU MAY RE-POST THE PROPERTY BY PAYING A RE-POSTING FEE. THIS FEE MUST BE PAID BEFORE YOUR PROPERTY CAN BE POSTED FOR AN ADDITIONAL AUCTION PERIOD. YOU MAY USE A CREDIT CARD OR PAY BY CERTIFIED FUNDS. A CUSTOMER SERVICE REPRESENTATIVE WILL CONTACT YOU TO RE-POST YOUR PROPERTY.

MULTIPLE POSTING PROGRAMS ARE OFFERED FOR THOSE PEOPLE INTERESTED IN AUCTIONING A PREDETERMINED NUMBER OF PROPERTIES PER TIME PERIOD. PLEASE CONTACT OUR MARKETING DEPARTMENT FOR ADDITIONAL INFORMATION. PRICE REDUCEDUCTIONS BASED ON THE NUMBER OF PROPERTIES CONTRACTED TO BE POSTED OR LISTED THROUGH THE WEB SITE IN A SPECIFIED PERIOD OF TIME. SUCH TIME PERIODS INCLUDE BUT ARE LIMITED TO QUARTERLY, SEMI-ANNUALLY, ANNUALLY, ETC.)

WHAT IT COSTS? BUTTON

FIG.14

SYSTEM AND METHOD FOR PROVIDING AN AUCTION OF REAL ESTATE

CROSS-REFERENCE TO RELATED APPLICATIONS

This application claims priority to and the benefit of copending U.S provisional patent application entitled "Zugbugauctions.com" filed on Jan. 29, 2001, and accorded Ser. No. 60/265,144 and U.S provisional patent application entitled "Zugbugauctions.com" filed on Apr. 27, 2001 and accorded Ser. No. 60/286,824, both of which are incorporated herein by reference in their entirety.

FIELD OF THE INVENTION

The present invention is generally related to internet commerce, and, more particularly, is related to a system and method for providing on-line auction of real estate.

BACKGROUND OF THE INVENTION

Currently, most real estate auctions occur in person and typically are performed on the courthouse steps in the county in which the real estate being auctioned resides. Typically, the real estate up for auction is real estate that has been foreclosed upon by a lending institution. The problem is that, to execute current real estate auctions in person, there is a huge requirement for being at the auction at the right time and with the proven ability to submit a bid. Because these auctions must be scheduled, there typically is also the problem that they occur on a schedule that is setup in advance. Impromptu auctions are very hard to execute as it is quite difficult to provide adequate notice to all those parties that may wish to submit a bid.

Many auctions were used throughout the world in an onsite manner without any electronic addition. Furthermore auctions were usually an absolute auction in which the highest bidder won no matter what the price. In some countries this is the standard method of selling real estate. But due to the inefficiency of having to be onsite and most bidding methods, raising a hand, it has not be suitable or accepted by most sellers. An absolute auction has a great risk of producing an undesirable low price. Some auctions use a reserve but on rare occasion due to the fact that buyers have traveled to the location and a sell must happen. In an onsite auction there is a great deal of pressure and buyers remorse in making a wrong decision in the heat of the moment can occur.

Thus, a heretofore unaddressed need exists in the industry to address the aforementioned deficiencies and inadequacies.

SUMMARY OF THE INVENTION

The present invention provides a system and method for providing a real estate auction system. In architecture, the system includes a server device on a network comprising a means for posting a real estate property for auction, a means for acquiring a plurality of data items describing the real estate property for auction from a seller remote device, a means for making the real estate property available at auction to a bidder remote device; and a means for accepting a bid on the real estate property for auction from at least one potential buyer for a predetermined period. The present invention can also be viewed as a method for providing a real estate auction. In this regard, the method can be broadly summarized by the following steps: (1) posting a real estate property for auction; (2) acquiring a plurality of data items describing the real estate property for auction; (3) making the real estate property available at auction; and (4) accepting a bid on the real estate property for auction from at least one potential buyer for a predetermined period.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 14 is a flowchart illustrating the preferred functionality of an example of the what it costs process utilized by the real estate auction system of the present invention, as shown in FIGS. 1B, 2A and 2B.

DETAILED DESCRIPTION OF THE INVENTION

Figure 1A:
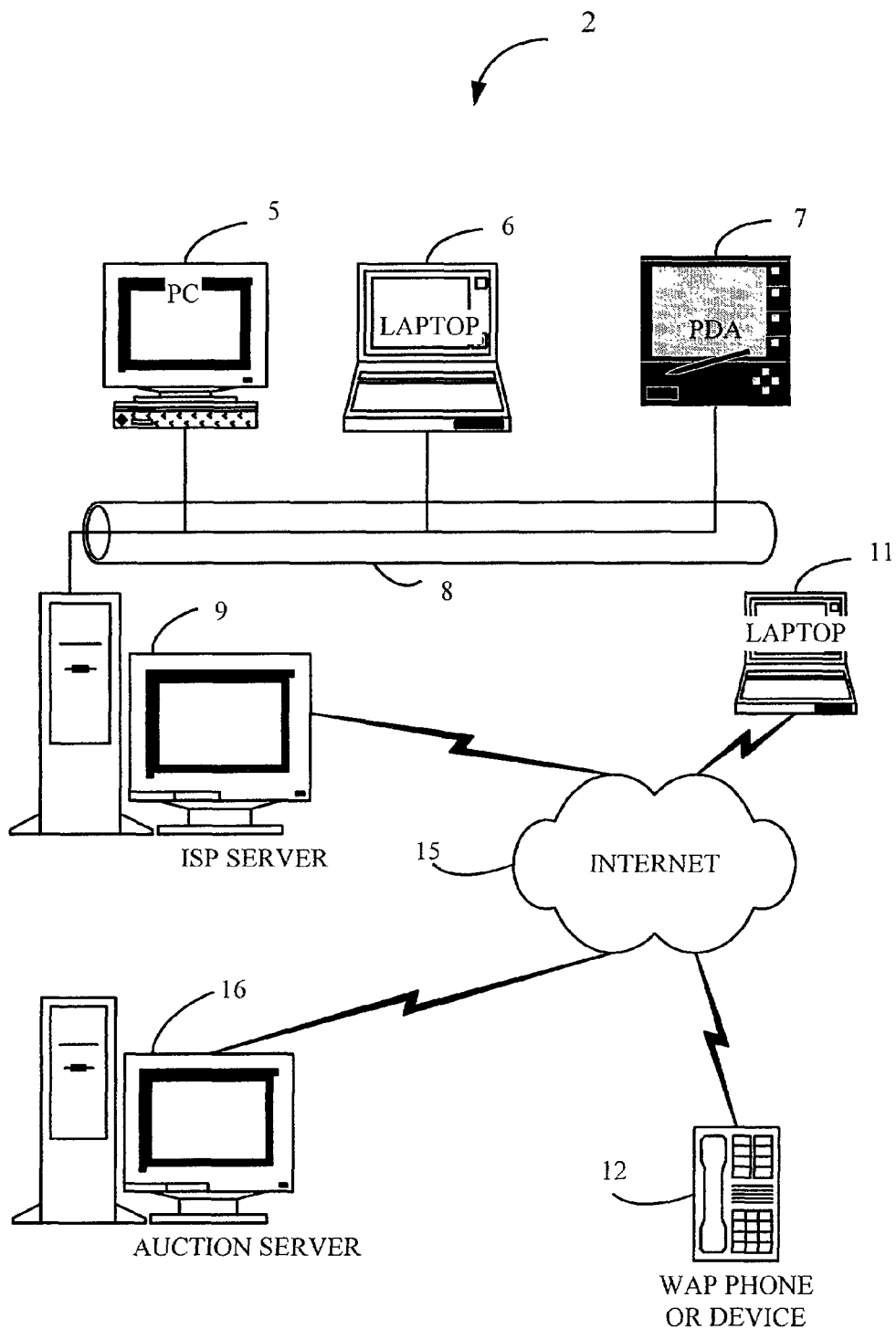
FIG. 1A is a block diagram illustrating an example of the configuration of the real estate auction system of the present invention.

Reference will now be made in detail to the description of the invention as illustrated in the drawings. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

The internet auction processes become a common method of both buying and selling many items and services in our economy today. The real estate auction system of the present invention uses these technologies and methods of the internet to operate a real estate auction business that let's consumers and professionals auction residential and commercial real estate over the internet in a professional and secure way.

This is important because the current real estate industry is facing a sea of changes and challenges. The Federal Reserve and the treasury departments are looking into proposals that would allow federally chartered banks to engage in real estate, brokerage and property management. The internet then would be allowing a large number of consumers to do many transactions themselves where they used to have to go through middlemen such as brokers and agents. Real estate brokers and agents will now be forced to use the internet and accept internet businesses and methods as a standard fair. The real estate auction system of the present invention is designed and built to be very easy to use for all users. The simple design allows for quick review and purchases of the real estate properties. Thus, buyers, sellers and investors will be able to utilize a simple, low cost solution for the real estate market.

The auction portion of the real estate auction system of the present invention is generally the preferred embodiment. However, there are alternative embodiments in the real estate auction system of the present invention that provides access to services such as appraisals, inspections, mortgages, insurance, and neighborhood reports. This information may be obtained from related business partners and companies that have designed to allow interaction with the real estate auction system of the present invention.

The real estate auction system of the present invention not only provides real estate property information into an auction page, but also gives the public an opportunity to list their real estate property in an on-line property listing service as an option to the real estate auction. In addition, there is the ability to access an on-line store with items to help buyers, sellers, and investors to sell their property or access free classified ads such as accessing classified ads, a chat room or message forums.

Turning now to the drawings, FIG. 1A is a block diagram of possible system configurations that illustrate the flexibility and platform independence of the real estate auction system 40 and method of the present invention. While the real estate auction system 40 configurations could take many forms, the diagram of FIG. 1A illustrates a plurality of devices 5, 6, 7, 11 and 12 that may be connected to an auction server 16 either directly or by network. These examples of devices include, but are not limited to, PC's, laptops, PDA's, cell phones or any other type of wireless access protocol phone or device. The network can be for example, but is not limited to, a dial-in, coaxial cable, Ethernet, LAN, WAN, PSTN, Intranet and/or Internet networks 8 and 15. Each of the computer systems in FIG. 1A are uniquely illustrated to emphasize that real estate auction system 40 may operate on diverse hardware platforms.

Figure 1B:
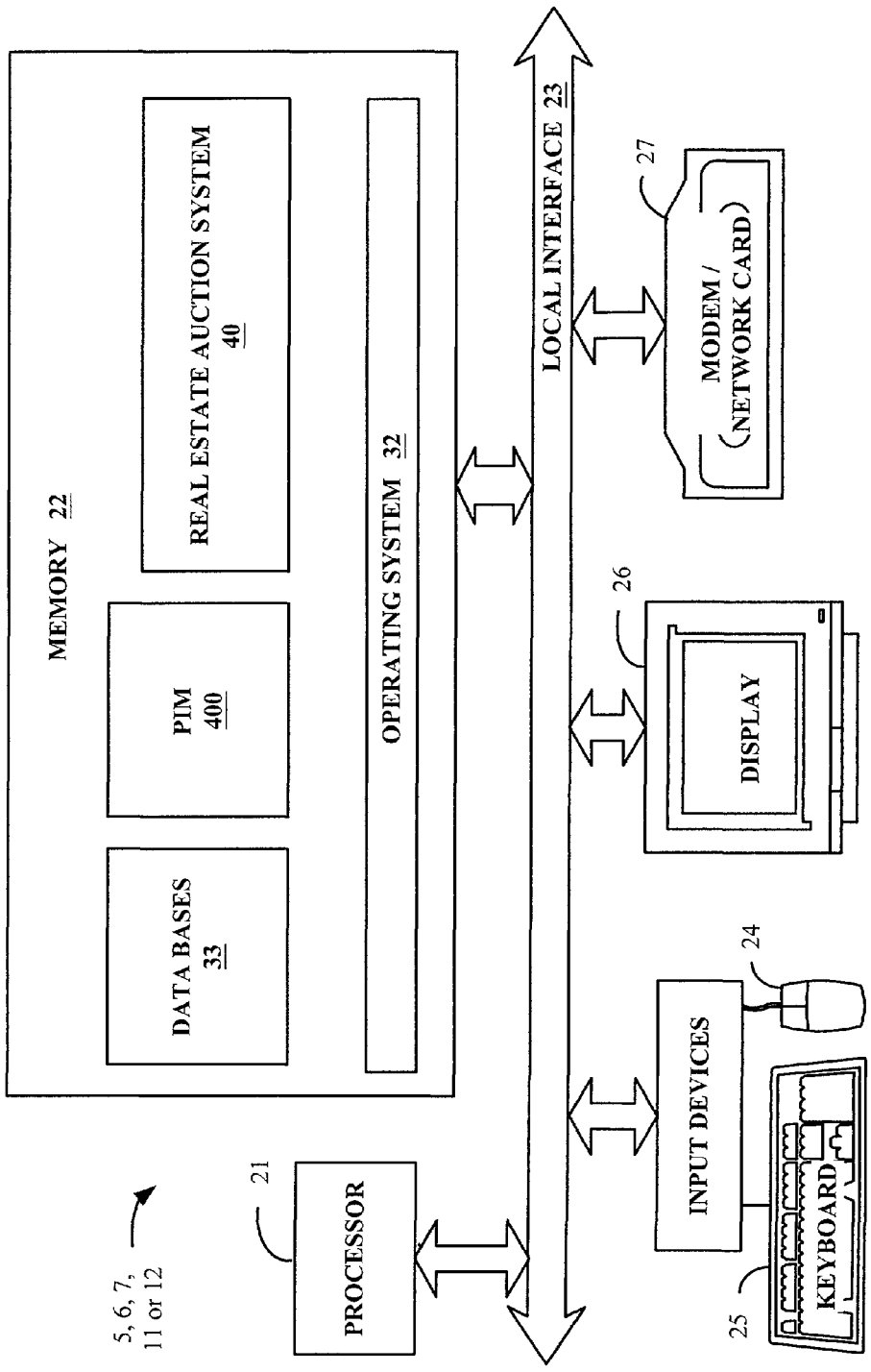
FIG. 1B is a block diagram of the real estate auction system 40 situated within a computer readable medium, within, for example, a computer system.

Turning now to the drawings, FIG. 1B is a block diagram example of a general-purpose computer device 5-7, 11 and 12 that can implement the real estate auction system 40. Generally, in terms of hardware architecture, as shown in FIG. 1, the computer device 5-7, 11 and 12 includes a processor 21, memory 22, and one or more input devices and/or output (I/O) devices (or peripherals) that are communicatively coupled via a local interface 23. The local interface 23 can be, for example but not limited to, one or more buses or other wired or wireless connections, as is known in the art. The local interface 23 may have additional elements, which are omitted for simplicity, such as controllers, buffers (caches), drivers, repeaters, and receivers, to enable communications. Further, the local interface 23 may include address, control, and/or data connections to enable appropriate communications among the aforementioned components.

The processor 21 is a hardware device for executing software that can be stored in memory 22. The processor 21 can be virtually any custom made or commercially available processor, a central processing unit (CPU) or an auxiliary processor among several processors associated with the computer device 5-7, 11 and 12, and a semiconductor based microprocessor (in the form of a microchip) or a macroprocessor. Examples of suitable commercially available microprocessors are as follows: an 80x86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 22 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 22 may incorporate electronic, magnetic, optical, and/or other types of storage media. Note that the memory 22 can have a distributed architecture, where various components are situated remote from one another, but can be accessed by the processor 21.

The software in memory 22 may include one or more separate programs, each of which comprises an ordered listing of executable instructions for implementing logical functions. In the example of FIG. 1B, the software in the memory 22 includes an operating system 32, the real estate auction system 40, Custom owned property information gathering program/manager (PIM) and database 33.

A non-exhaustive list of examples of suitable commercially available operating systems 32 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 32 essentially controls the execution of other computer programs, such as the checksum code operation mechanism, and provides scheduling, input-output control, file and data management, memory management, and communication control and related services.

The real estate auction system 40 may be a source program, executable program (object code), script, or any other entity comprising a set of instructions to be performed. When a source program, then the program is usually translated via a compiler, assembler, interpreter, or the like, which may or may not be included within the memory 22, so as to operate properly in connection with the O/S 19. Furthermore, the real estate auction system 40 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, and Ada.

The I/O devices may include input devices, for example but not limited to, a keyboard 25, mouse 24, scanner, microphone, etc. Furthermore, the I/O devices may also include output devices, for example but not limited to, a printer, display 26, etc. Finally, the I/O devices may further include devices that communicate both inputs and outputs, for instance but not limited to, a modulator/demodulator 27 (modem; for accessing another device, system, or network), a radio frequency (RF) or other transceiver, a telephonic interface, a bridge, a router, etc.

If the computer device 5-7, 11 and 12 is a PC, workstation, or the like, the software in the memory 22 may further include a basic input output system (BIOS) (omitted for simplicity). The BIOS is a set of essential software routines that initialize and test hardware at startup, start the O/S 19, and support the transfer of data among the hardware devices. The BIOS is stored in ROM so that the BIOS can be executed when the computer device 5-7, 11 and 12 is activated.

When the computer 5 is in operation, the processor 21 is configured to execute software stored within the memory 22, to communicate data to and from the memory 12, and to generally control operations of the computer 5 pursuant to the software. The real estate auction system 40 and the O/S 32 are read, in whole or in part, by the processor 21, perhaps buffered within the processor 21, and then executed.

When the real estate auction system 40 is implemented in software, as is shown in FIG. 1B, it should be noted that can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The real estate auction system 40 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where real estate auction system 40 is implemented in hardware, the real estate auction system 40 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2A:
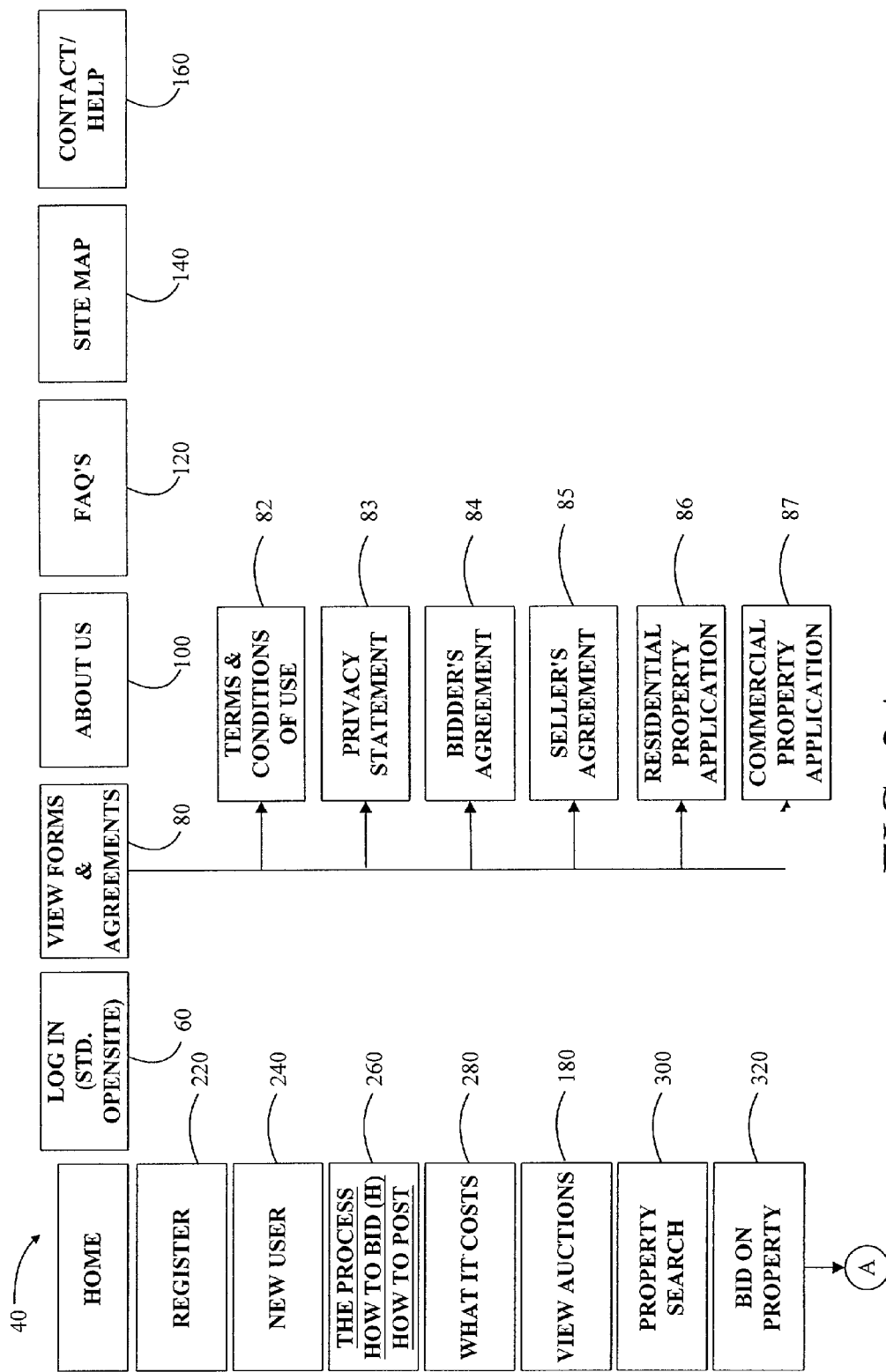
FIGS. 2A and 2B are block diagrams of the real estate auction system 40 and the components within the real estate auction system of the present invention.
Figure 2B:
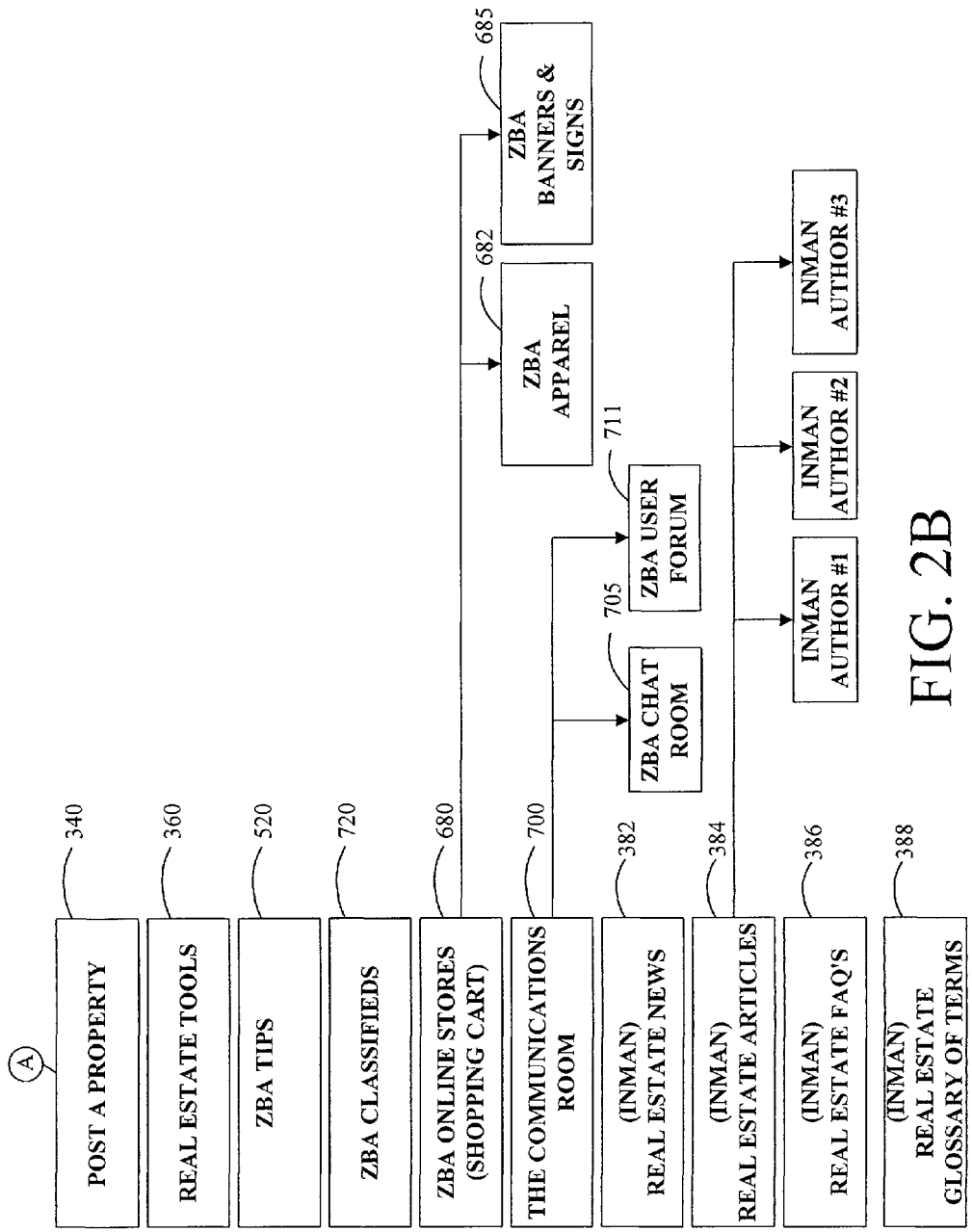

As illustrated in FIGS. 2A and 2B are block diagrams of the real estate auction system 40 and the components within the real estate auction system of the present invention. The real estate auction system 40 includes the following processes: login process 60, view forms process 80, about us process 100, FAQ's process 120, site map process 140, contact process 160, view auctions 180, register process 220, new user process 240, the bid process 260, what it costs process 280, property search process 300, bid on property process 320, post a property process 340, resources process 360, Inman real estate—news articles, FAQ's and glossary terms processes 382, 384, 386 and 388, ZBA tips process 520, ZBA on-line store process 680, communications chat process 700, and ZBA classifieds process 720 in memory area 22. Databases 33 are also shown to reside in memory area 22. These components are herein described in further detail with regard to FIGS. 3-33A & B.

Figure 3:
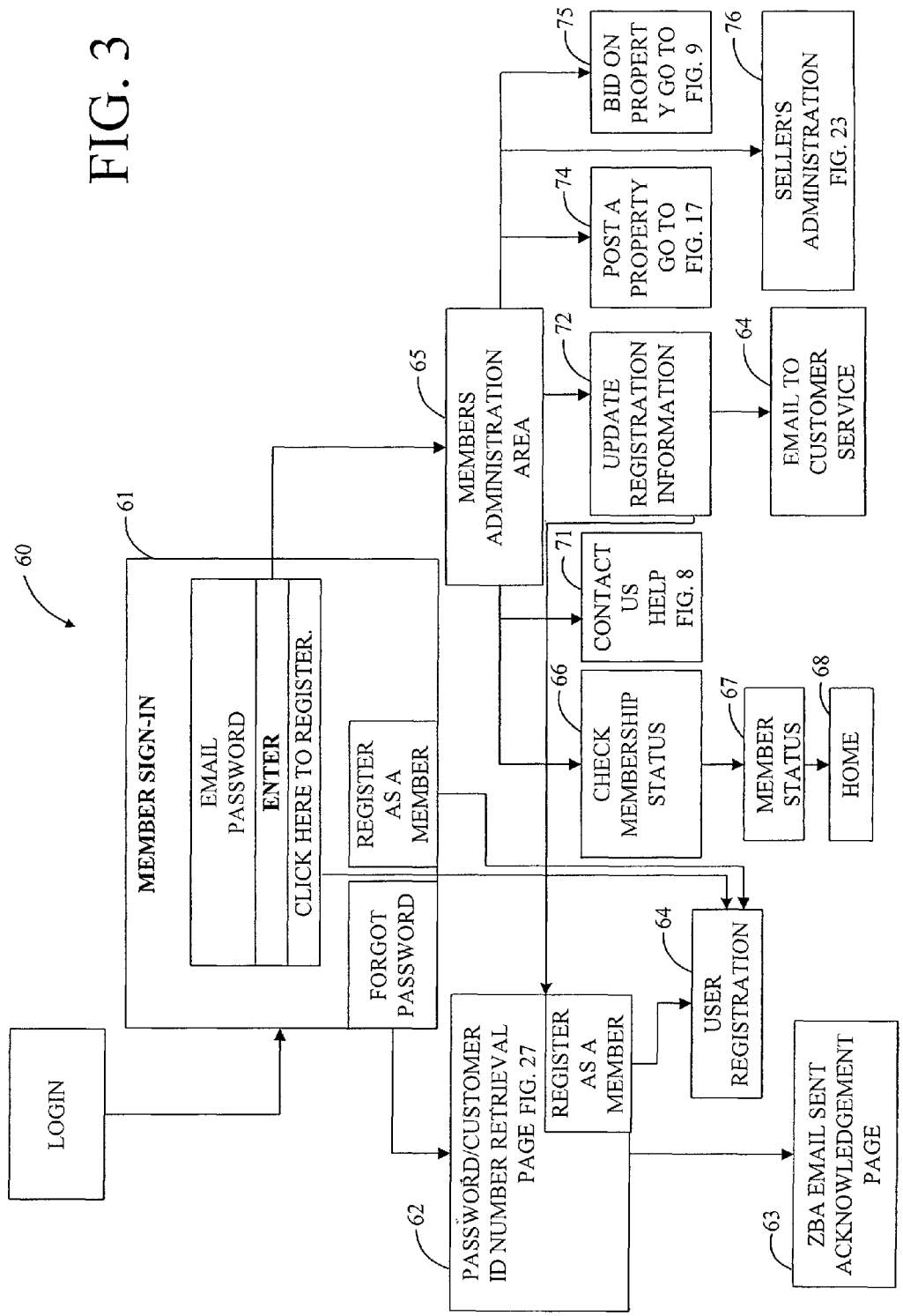
FIG. 3 is a flowchart illustrating the preferred functionality of an example of the login process for the real estate auction system of the present invention, as shown in FIGS. 1B, 2A and 2B.

As illustrated in FIG. 3 is a flowchart illustrating the preferred functionality of an example of the login process 60 provides for primary user access to the real estate auction system 40 of the present invention. First upon entering the login process 60 the user performs the member login at step 61. In the preferred embodiment, the required login data includes, but is not limited to, email address and password. At step 61, the login process also determines if the member has forgotten their password. If it is determined at step 61 that the member has forgotten their password, then the login process 60 proceeds to step 62 in order to help the member obtain their forgotten password. The password/customer ID number retrieval process is hereindefined in further detail with regard to FIG. 22, FIG. 27 then on to FIG. 3 for the actual retrieval process.

After helping the member to obtain their password, the real estate auction system 40 then emails an acknowledgement at step 63 and returns to step 61 for further processing. However, if is determined that step 62 that the member is not a valid member, the process then proceeds to step 64 to send the member to user registration. The user registration process is hereindefined in further detail with regard to FIG. 11. After performing the user registration the process then returns to step 61 to complete the member login.

If it is determined that the user is not a current member, then the user is then sent to the user registration process at step 64. As noted above, the user registration process is hereindefined to further detail with regard to FIG. 11. After performing the user registration, the user is returned to the membership login step at step 61. After performing the proper membership login, the user then proceeds to the membership area at step 65.

At step 65, the user can then perform a variety of tasks. The first task is to check their membership status at step 66. Upon checking their membership status at step 66, the member status is then sent to the member at step 67 and the user is returned to the home menu at step 68. However, if it is determined at step 65 that the member wishes to contact their real estate auction system 40 providers, the member is then sent to step 71 in order to contact the system providers. This contact is provided through the contact process which is hereindefined in further detail with regard to FIG. 8. After performing the contact step the user is then returned to step 65 for further processing.

It is determined at step 65 however that the member wishes to update registration information, then the user proceeds to step 72 which allows for updating of registration information. After performing the updated registration information, an email is sent to the customer service in order to provide the updated registration information. After performing the email step at step 73, the users return to step 65 for further processing.

If is determined at step 65 that the member wished to post a property, then the user proceeds to post a property step at step 74. The post property functionality is hereindefined in further detail with regard to the post property process hereindefined in further detail with regard to FIG. 17. After posting a property, the member is then returned to step 65 for continued processing.

However, if it is determined at step 65 that the user wishes to bid on a property, then the user proceeds to step 75 to bid on a property. In order to bid on a property, the user is then directed to the bid process hereindefined in further detail with regard to FIG. 9 and/or FIG. 16. After performing the bid, the user is then returned to the member administration area at step 65 for further processing.

However, if it is determined at step 65 that the member wishes to perform seller administration procedures, then the member is proceeds to step 76 to perform those administrative duties. The seller administrative duties are hereindefined in further detail with regard to the seller administration process hereindefined in further detail with regard to FIG. 23. After performing the seller administrative process, the member is then returned to step 65 for further processing.

Figure 4:
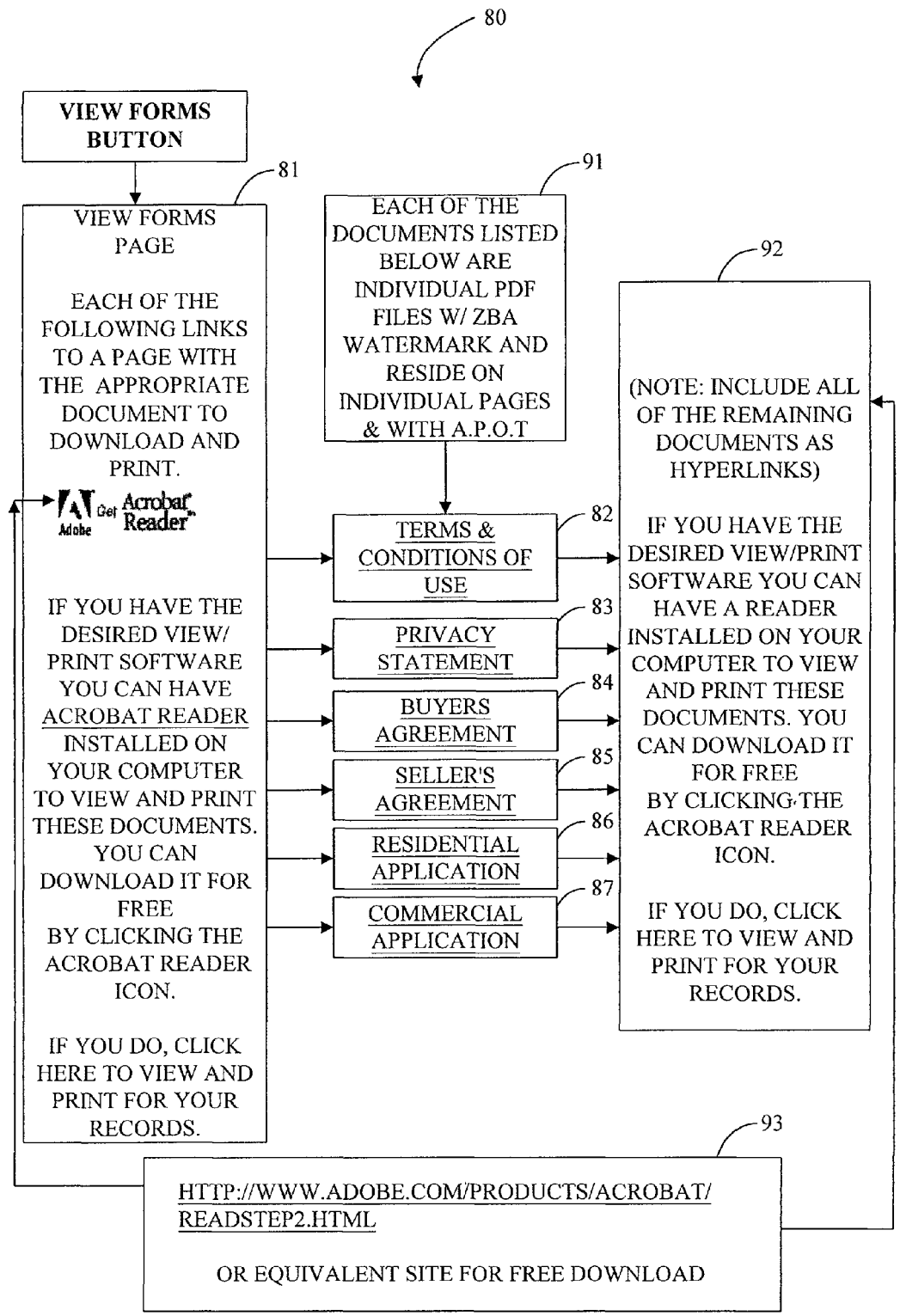
FIG. 4 is a flowchart illustrating the preferred functionality of an example of the forms viewing process utilized by the real estate auction system of the present invention, as shown in FIGS. 1B, 2A and 2B.

As illustrated in FIG. 4 is a flowchart illustrating the preferred functionality of an example of the forms viewing process 80 utilized by the real estate auction system of the present invention, as shown in FIGS. 1B, 2A and 2B. The forms viewing process 80 takes the user to the view forms page at step 81. At step 81 the user is then prompted to select a number of forms for display or print. The forms include, but are not limited to, terms of use, privacy statements, buyer agreements, seller agreements, residential applications, and commercial applications. It is possible to obtain these documents below in individual PDF format at step 91. If it is determined that the member does not have the capability to read PDF files, the appropriate reader file may be downloaded at step 92. After determining which file reader is needed, the view forms process 80 then proceeds to step 93 to download the appropriate reader file and then return to the view forms step 81 to enable the user to then view the appropriate forms.

Figure 5:
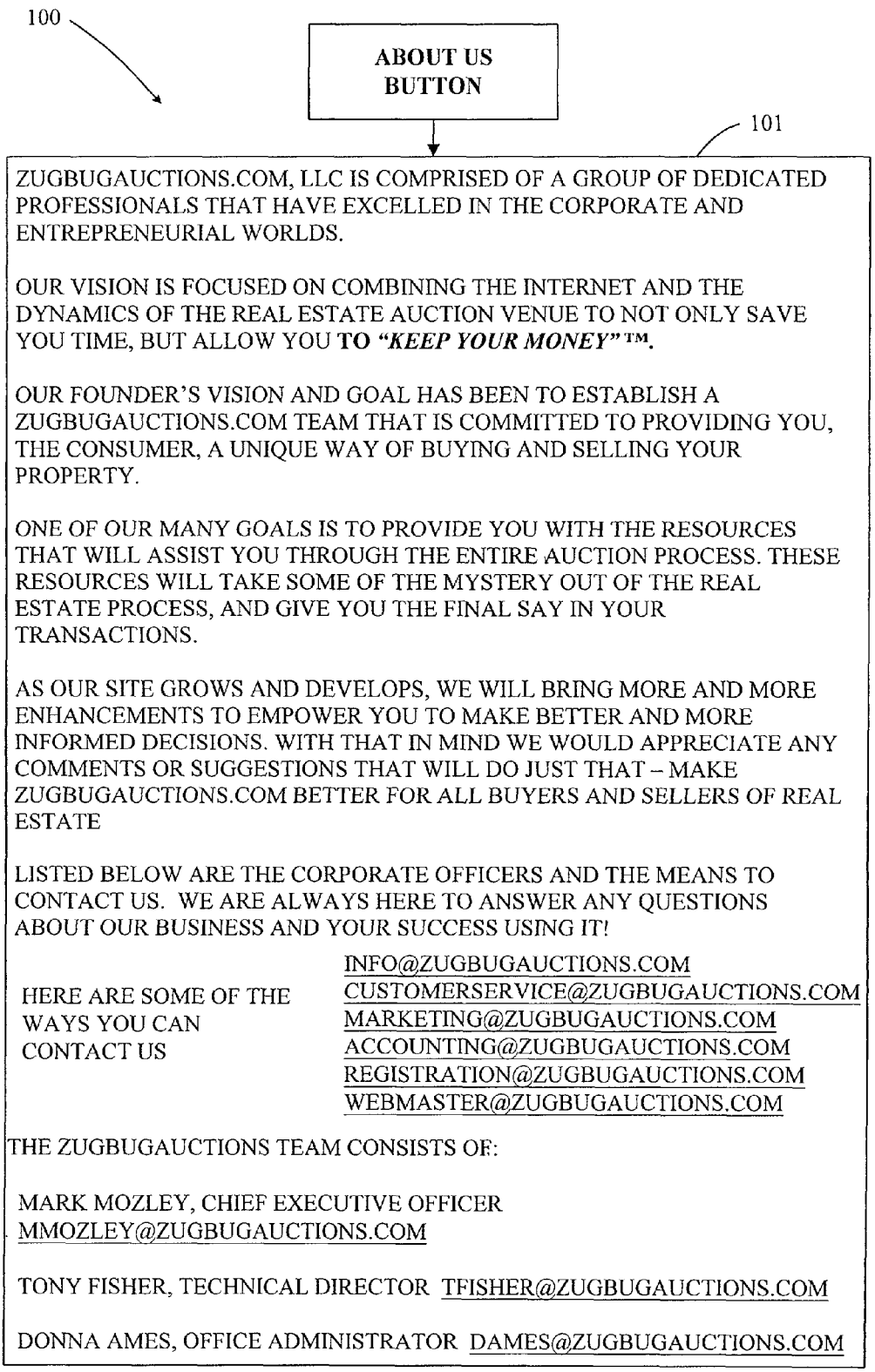
FIG. 5 is a flowchart illustrating the preferred functionality of an example of the about us utilized by the real estate auction system of the present invention, as shown in FIGS. 1B, 2A and 2B.

As illustrated in FIG. 5 is a flowchart illustrating the preferred functionality of an example of the about us process 100 utilized by the real estate auction system of the present invention, as shown in FIGS. 1B, 2A and 2B. The about us process 100 is basically a display of information on the providers of the real estate auction system 40. After selecting the about us process 100, the about us information page is then displayed at step 101. This information is modifiable by the provider of the real estate auction system 40 and can be displayed to all users of the real estate auction system 40.

Figure 6:
FIG. 6 is a flowchart illustrating the preferred functionality of an example of the frequently asked questions process as utilized by the real estate auction system of the present invention, as shown in FIGS. 1 B, 2A and 2B.

As illustrated in FIG. 6 is a flowchart illustrating the preferred functionality of an example of the frequently asked questions process 120 utilized by the real estate auction system of the present invention, as shown in FIGS. 1B, 2A and 2B. The frequently asked questions process 120 includes a display of those questions frequently asked of the real estate auction system 40 provider. After selecting the frequently asked questions process 120, the user then is able to view the frequently asked questions at step 121. These questions include, but are not limited to, seller procedures, seller tips, buyer procedures, buyer tips, and the like.

Figure 7:
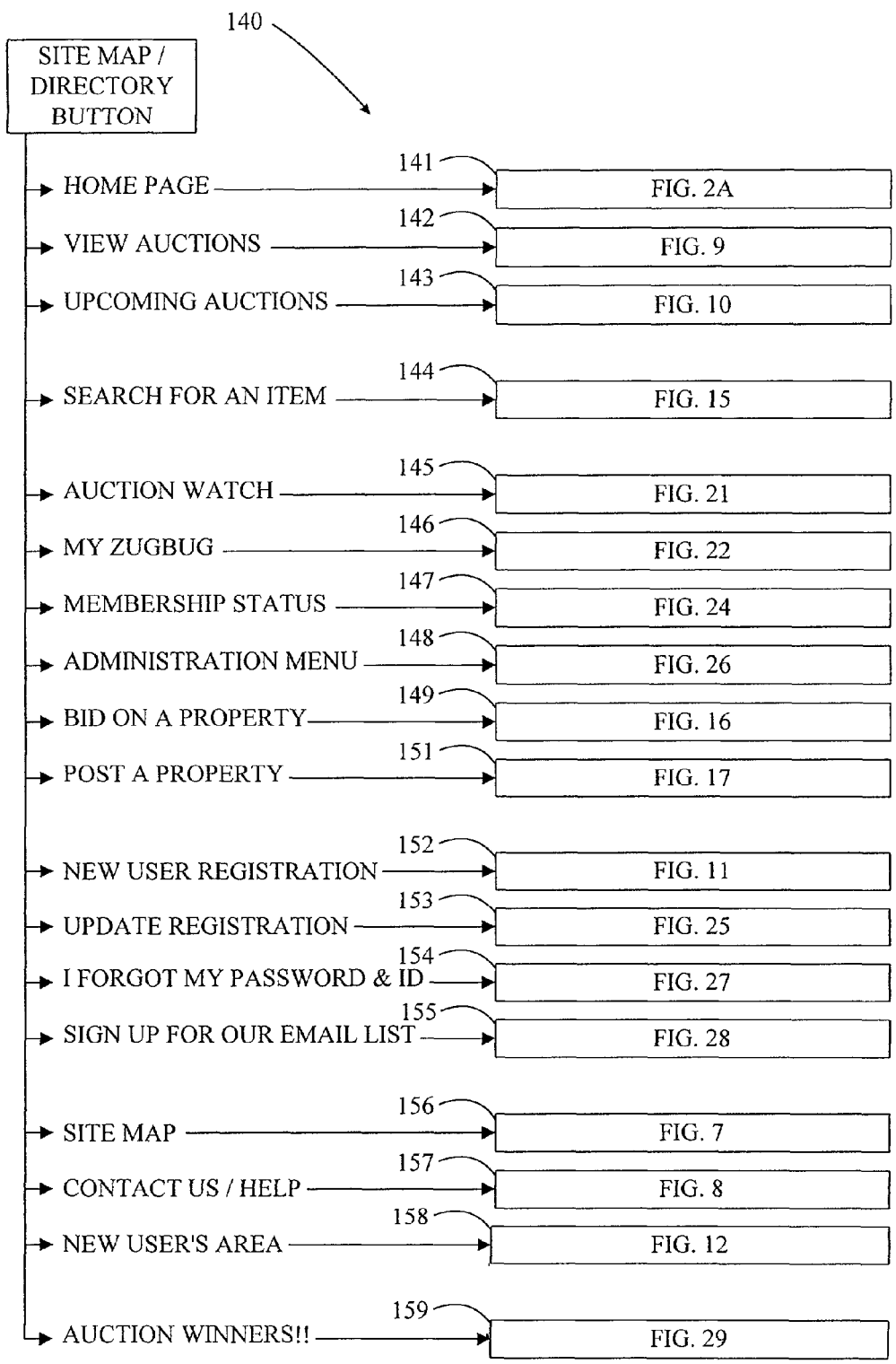
FIG. 7 is a flowchart illustrating the preferred functionality of the site map directory process utilized by the real estate auction system of the present invention, as shown in FIGS. 1B, 2A and 2B.

As illustrated in FIG. 7 is a flowchart illustrating the preferred functionality of the site map directory process 140 utilized by the real estate auction system of the present invention, as shown in FIGS. 1B, 2A and 2B. The site map directory process 140 is hereinprovided as a road map to the different functionality available in the real estate auction system of the present invention. The site map directory process 140 allows the user to select the desired functionality and proceed directly to the appropriate process for providing that functionality. The functionality includes returning to the home page at step 141. It is hereindefined in further detail with regard to FIG. 2A. Next, the user can view auctions at step 142. The view auctions process is hereindefined in further detail with regard to FIG. 9. In the alternative, the user can also view upcoming auctions at step 143. The upcoming auctions are hereindefined in further detail with regard to FIG. 10.

The site map directory process 140 also provides the ability for the user to perform a search. Searching for an item is provided at step 144, which is herein defined in further detail with regard to FIG. 15.

The site map directory process 140 also provides for a number of member services. The first service being the auction watch service, which is provided at step 145. The auction watch is hereindefined in further detail with regard to FIG. 21. At step 146, the functionality to provide a targeted area search for property is provided and is hereindefined in further detail with regard to FIG. 22. The user may determine the membership access at step 147, which is hereindefined in further detail with regard to FIG. 24. The administration menu provides the ability to provide update registration information, which is hereindefined in further detail with regard to FIG. 26. Furthermore, the user is able to either bid on a property at step 149, and is hereindefined in further detail with regard to FIG. 16 or post a property for bid at step 151, which is hereindefined in further detail with regard to FIG. 17.

There is a number of registration steps that the user can perform and these steps are hereindefined in further detail with regard to steps 152-155. The steps include a new user registration at step 152, which is hereindefined in further detail with regard to FIG. 11. Updated registration information may be performed at step 153 and is hereindefined in further detail with regard to FIG. 25. If it is determined that the user has forgotten their password and ID, the user may obtain this information at step 154, which is hereindefined in further detail with regard to FIG. 27. In addition, the user may sign up for contact on a email list to receive updated information regarding the real estate auction system regarding information concerning the real estate auction system of the present invention and this information is hereindefined in further detail with regard to FIG. 28.

There is a number of information booth type functionality that the user may select, which includes the site map, at step 156, which is hereindefined in further detail with regard to FIG. 7. The user is also able to contact the providers of the real estate auction system 40 through the use of the contact help process, which is hereindefined in further detail with regard to FIG. 8. New users may set-up their information as step 158, which is hereindefined in further detail with regard to FIG. 12.

It is also possible for a user to request information with regard to auction winners. This auction winners information is here and obtained at step 159, which is hereindefined in further detail with regard to FIG. 29.

Figure 8:
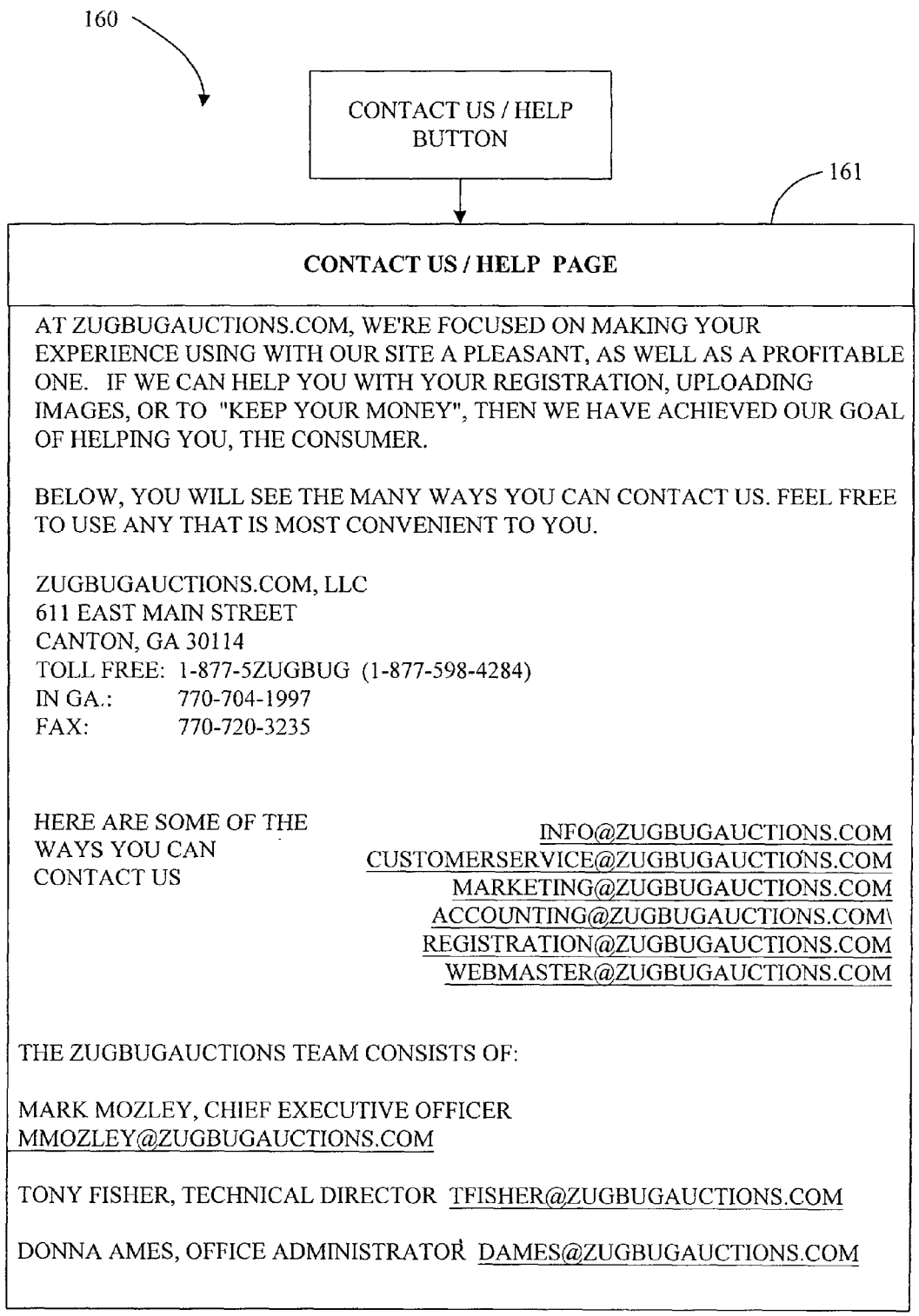
FIG. 8 is a flowchart illustrating the preferred functionality of the contact us/help process utilized by the real estate auction system of the present invention, as shown in FIGS. 1B, 2A and 2B.

As illustrated in FIG. 8 is a flowchart illustrating the preferred functionality of the contact us process 160 utilized by the real estate auction system of the present invention, as shown in FIGS. 1B, 2A and 2B. The contact us process 160 provides for the ability of a member to obtain information to contact the providers of the real estate auctions system of the present invention. This information is a general posting; however, it is updateable at any time by the providers of the real estate auction system 40. The contact us process 160 comprises of one step which is step 161 that upon selection of the contact us process, the real estate auction system of the present invention provides the contact information at step 161.

Figure 9:
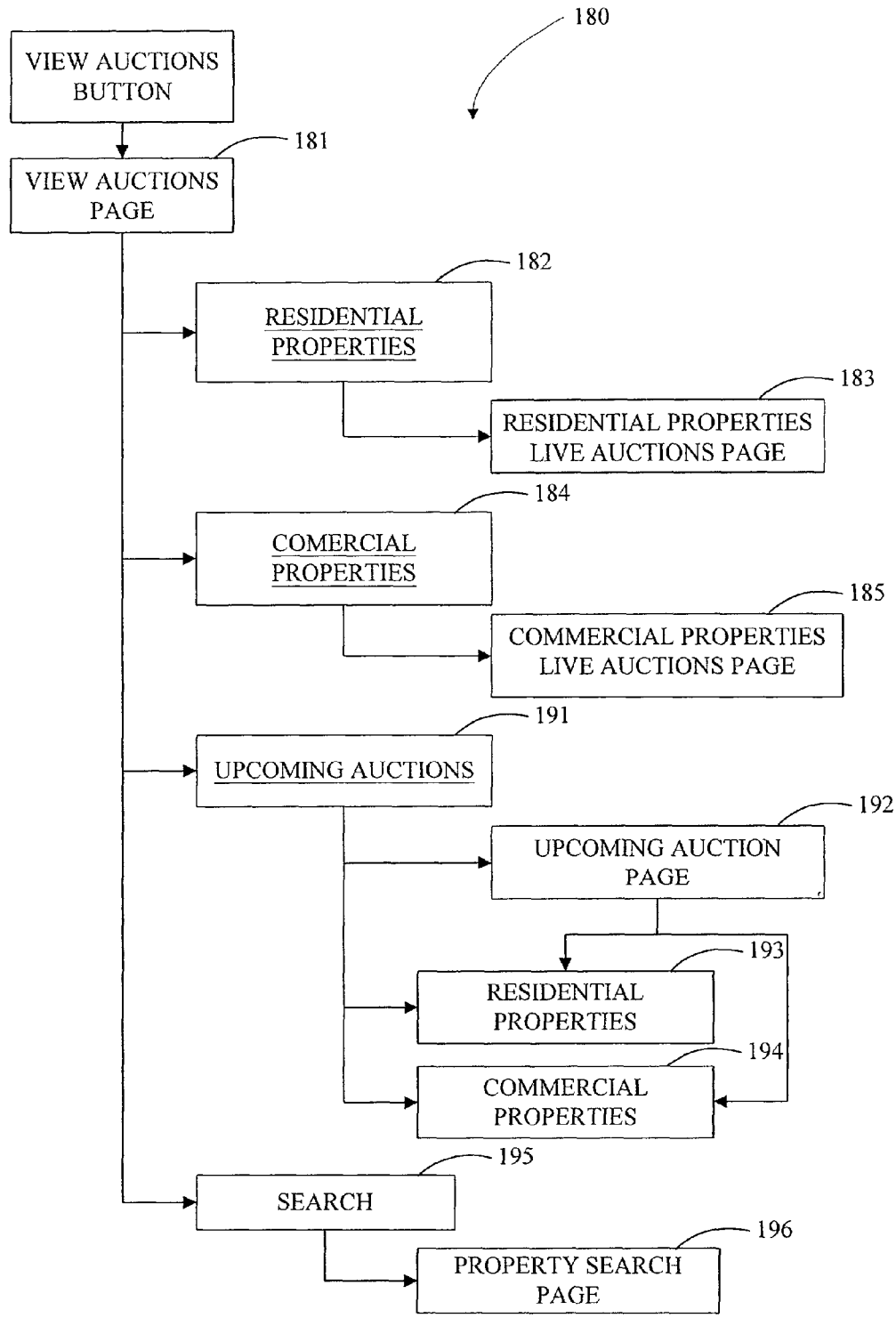
FIG. 9 is a flowchart illustrating the preferred functionality of the view auctions process utilized by the real estate auction system of the present invention, as shown in FIGS. 1B, 2A and 2B.

As illustrated in FIG. 9 is a flowchart illustrating the preferred functionality of the view auctions process 180 utilized by the real estate auction system of the present invention, as shown in FIGS. 1B, 2A and 2B. First, the view auctions process 180 is to provide information with regard to ongoing or upcoming auctions. Upon entering the view auctions process 180, the user is displayed a view auctions page at step 181, which allows the user to select whether or not residential properties, commercial properties, upcoming auctions or a search functionality as performed.

If it is determined if the user selects residential properties then the view auctions process 180 proceeds to steps 182 and 183 to actually provide user information with regard to residential properties by providing access to the live auctions page at step 183. However, if the user selects the commercial properties functionality, then the view auctions process 180 proceeds to steps 184 and 185 to provide information with regard to commercial properties. The user provided the information with regard to commercial properties by receiving live auctions data from the commercial properties live auctions page at step 185.

If it determined that the user has selected the upcoming auctions functionality, then the user proceeds to step 191-194. It is then determined at step 191 if the user wishes to view the upcoming auctions for all properties. If it is determined that the user wishes to view all upcoming auctions property information, the user then proceeds to step 192 and receives the upcoming auctions page. If it is determined at step 191 that the user wishes to receive the upcoming auctions data for their residential properties, then the user proceeds to step 193 to receive the data with regard to upcoming auctions of residential properties. However, if it is determined at step 191 that the user wishes to receive upcoming auctions data with regard to commercial properties, then the user proceeds to step 194 and receives the upcoming auctions data with regard to commercial properties.

However, if it is determined that the user has selected the search functionality, then the user proceeds to step 195. At step 195, the user is then directed to the property search page at step 196 in order to perform the desired search.

Figure 10:
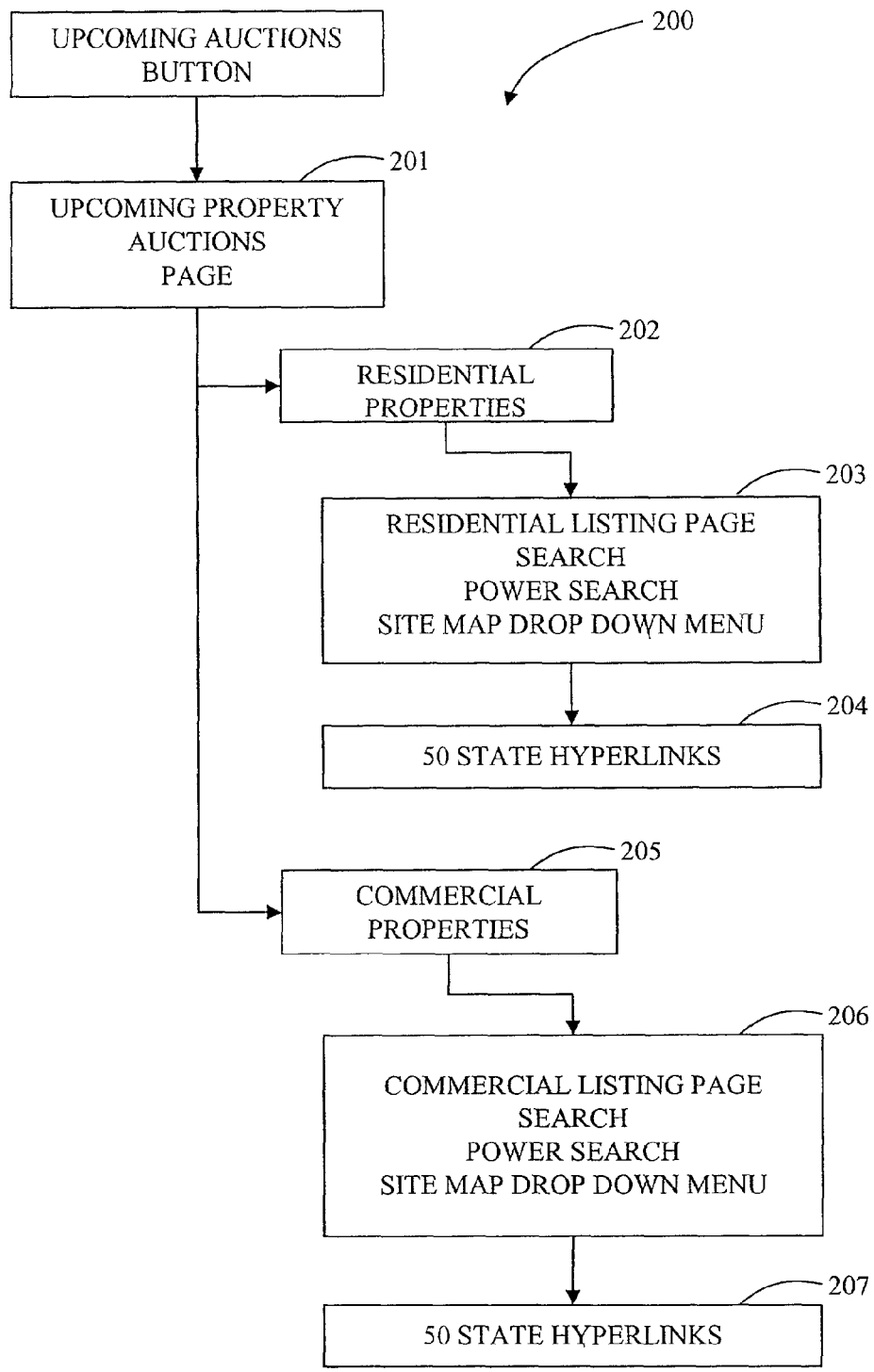
FIG. 10 is a flowchart illustrating the preferred functionality of the upcoming property auctions process utilized by the real estate auction system of the present invention, as shown in FIGS. 1B, 2A and 2B.

As illustrated in FIG. 10 is a flowchart illustrating the preferred functionality of the upcoming property auctions process 200 utilized by the real estate auction system of the present invention, as shown in FIGS. 1B, 2A and 2B. The upcoming property auctions process 200 can either be selected as a stand-alone process in the real estate auction system of the present invention or from step 192 (FIG. 9).

First, the upcoming property auctions page is displayed at step 201. Next, it is determined whether or not residential properties or commercial properties are to be selected for display for upcoming auctions. If it is determined that residential properties are to be selected, then the upcoming auctions process 200 then proceeds to step 202 to process upcoming residential properties. The upcoming residential listing page is displayed at step 203 and includes the ability to search, power search and site map drop down menu search. After providing the residential listing page, the upcoming auctions process 200 then adds 50 state hyperlinks at step 204.

However, if it is determined at step 201 that the commercial properties are to be processed, then the upcoming property auctions process 200 proceeds to step 205 to provide information regarding upcoming commercial property auctions. In providing that information the upcoming property auctions process 200 then provides a commercial listing page at step 206. Also provided is the functionality to perform a search, power search, or site map dropdown menu search. After providing the commercial listings page at step 206, then the upcoming property auctions process 200 then allows for fifty state hyperlinks to be added at step 207.

Figure 11:
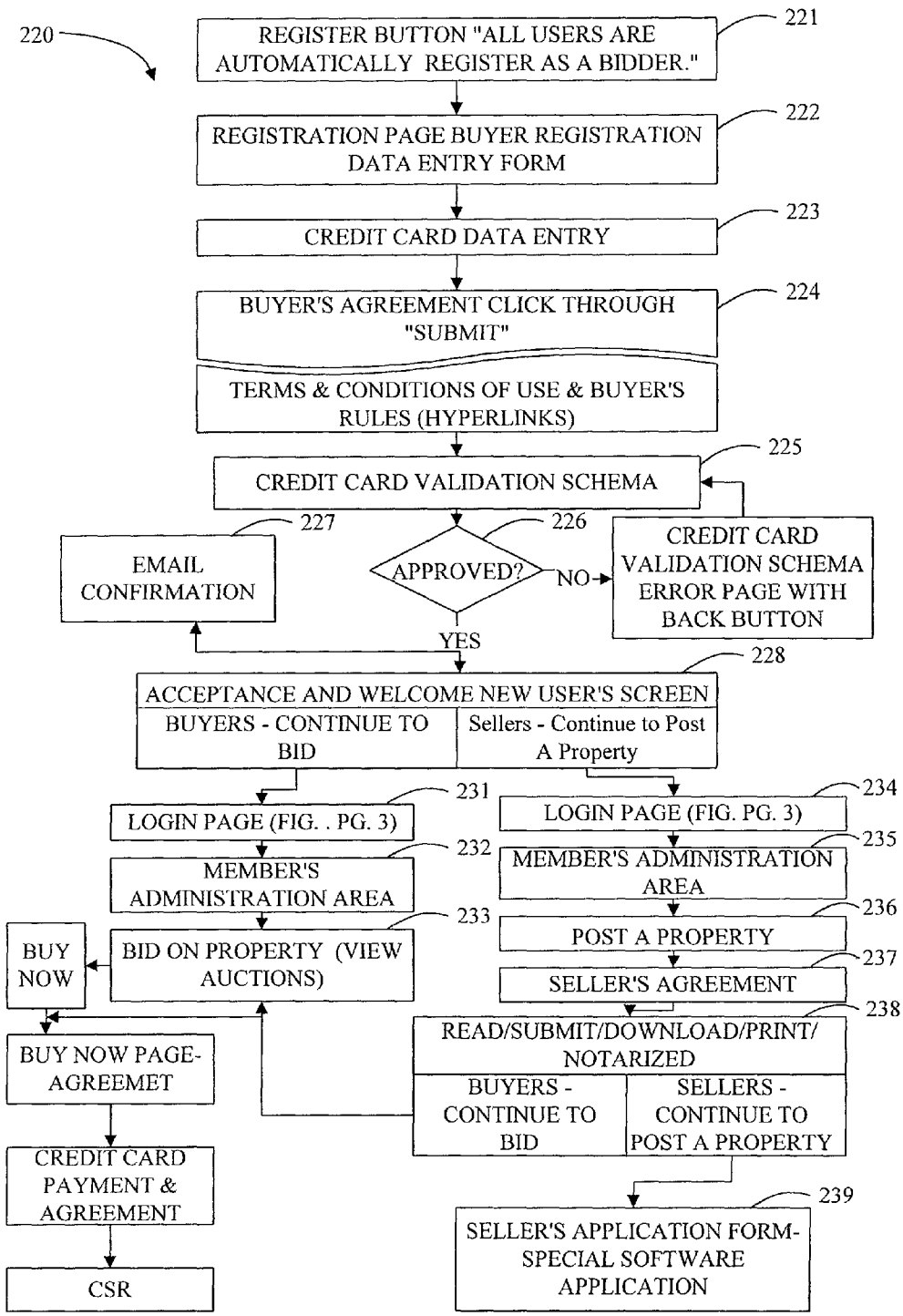
FIG. 11 is a flowchart illustrating the preferred functionality of the register process utilized by the real estate auction system of the present invention, as shown in FIGS. 1B, 2A and 2B.

As illustrated in FIG. 11 is a flowchart illustrating the preferred functionality of the register process 220 utilized by the real estate auction system of the present invention, as shown in FIGS. 1B, 2A and 2B. The register process 220 allows a member to register themselves as either a buyer and/or seller.

First, the registration process 220 enables all users to be automatically registered as a bidder at step 221. At step 222, the registration page and the buyer's registration data entry form is displayed to collect information. At step 223, the registration process 220 allows for credit card data entry for validating who the registratant is. At step 224, the member is solicited to click through the buyer's agreement. In the preferred embodiment this agreement can be acknowledged by clicking through to submit. The terms and conditions of use and the buyer's rules are then provided to the member via hyperlinks and downloadable print. At step 225, the credit card information is validated.

At step 226, the registration process then determines if the credit card data has been validated. If it is determined in step 226 that the credit card data is not validated, then the credit card validation schema error page is displayed to the user and the user returns to step 225 to allow for the modification of credit card information. However, if it is determined at step 226 that the credit card data was valid, then the register process 220 then proceeds to step 227 to email a confirmation of the registration to the user and at step 228 to display the acceptance and welcome new user screen. At step 228, the user is then solicited to indicate the desired functionality. If the user functionality desired is for a buyer in order to continue to make a bid, then the registration process 220 proceeds to step 231 in order to process the login page. The login page has been previously discussed herein above with reference to FIG. 3. After performing the login, the registration process 220 then sends the user to the member's administration area at step 232. The membership administration functionality is herein defined in further detail with regard to FIG. 26. After performing the member's administration functionality, the register process 220 then enables the user to bid on properties at step 233. The user is enabled to bid on properties by proceeding to the view options functionality herein described above with regard to FIG. 9 and by picking a option to proceed to the property page from which he can place a bid.

However, if it is determined at step 228 that the user is a seller, and wishes to continue to post a property, then the registration process 220 proceeds to step 234 to enable the user to login. The login functionality is herein described in further detail with regard to FIG. 3. After performing the login process, the user then proceeds to the member's administration area which is herein defined in further detail with regard to FIG. 26. After performing the member's administration functionality, the user is then prompted to post a property at step 236. The functionality defining the post a property is herein defined in further detail with regard to FIG. 17. After performing the post a property functionality, the user is then solicited to process the seller's agreement in step 237. After acknowledging the seller's agreement, the user then read, submits, downloads, prints and notarizes the agreement at step 238. If the seller wishes to continue to post a property, the seller then proceeds to step 239 and fills out the seller application form(which is part of the PIM) and elects whether to add the buy now feature after entering such data. However, if it is determined in step 228 that the user wishes to bid on a property, the user then proceeds to step 233 to bid on a property as defined above with regard to step 233.

Figure 12:
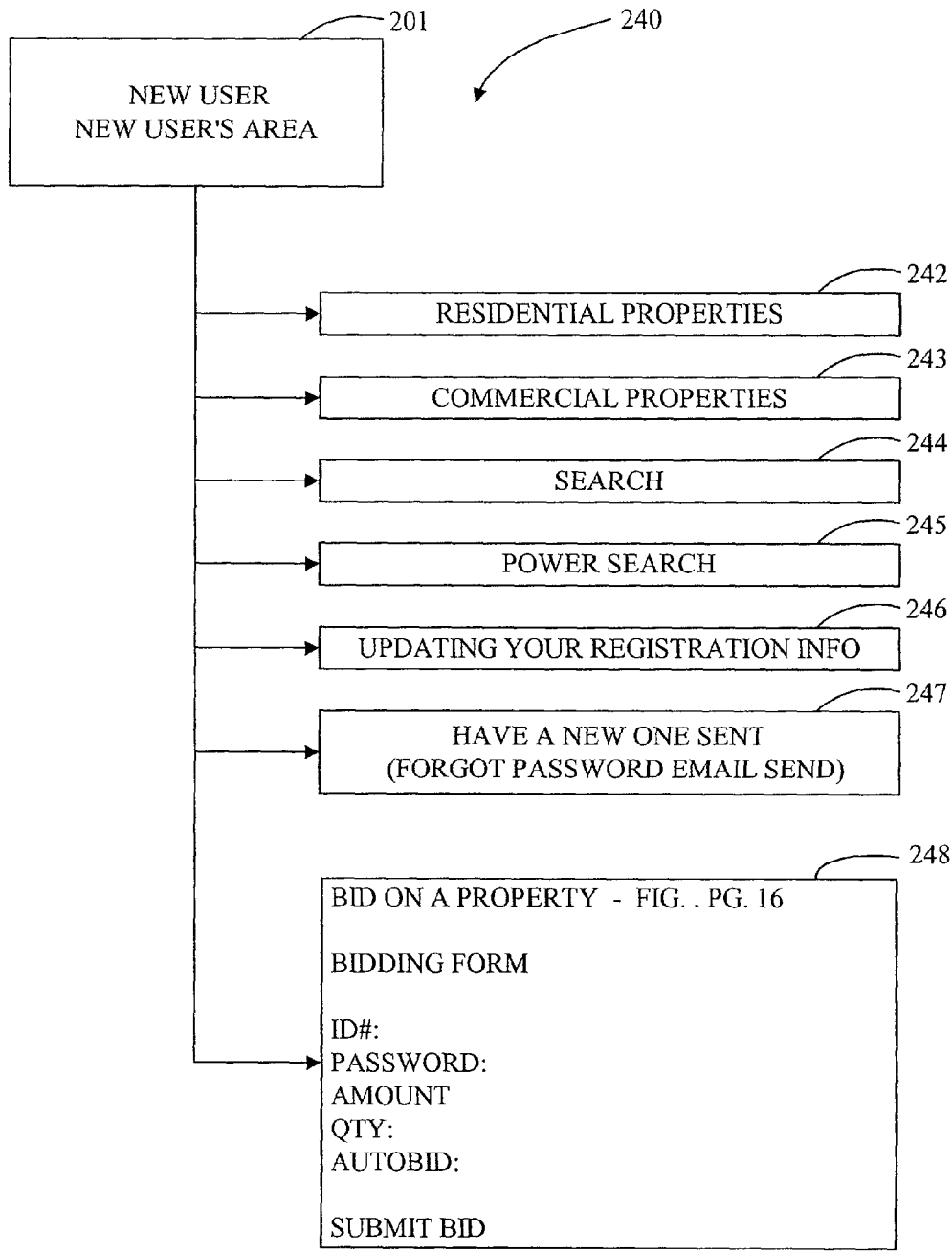
FIG. 12 is a flowchart illustrating the preferred functionality of the new user process utilized by the real estate auction system of the present invention, as shown in FIGS. 1B, 2A and 2B.

As illustrated in FIG. 12 is a flowchart illustrating the preferred functionality of the new user process 240 utilized by the real estate auction system of the present invention, as shown in FIGS. 1B, 2A and 2B. The new user process 240 helps direct a new user to the desired functionality.

At step 241, a new user is welcomed to the new user area. At step 241, the new user process 240 also determines the interest of the new user. If it is determined that the user is interested in residential properties, then the user proceeds to step 242 for further processes. However, if it is determined at step 241 that the user is interested in commercial properties, then the user is directed to step 243. At step 244 and 245, the user is prompted to either perform a search or a power search respectively. It is also possible for a new user to update their registration information. Updating of registration information is performed at step 246, which is herein defined in further detail with regard to FIG. 25. It is also possible for a new user to have forgotten their password and request that their password be sent to them at step 247. Having the user forget their password is provided for with regard to forgot password functionality herein defined in further detail with regard to FIG. 27. It is also possible for new user to bid on a property. The new user can process a bid on a property at step 248. The bid on a property is herein defined in further detail with regard to FIG. 16.

Figure 13:
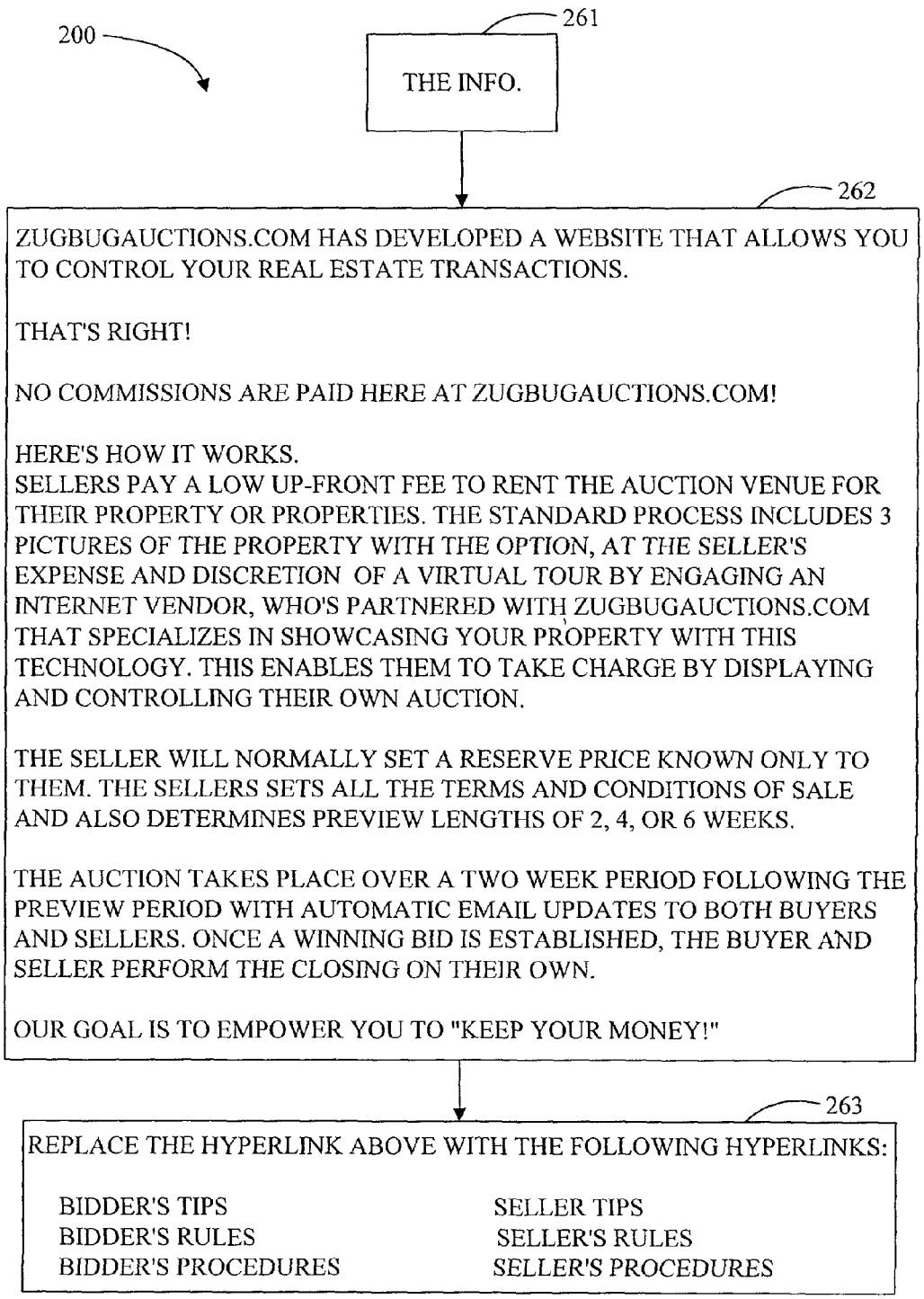
FIG. 13 is a flowchart illustrating the preferred functionality of an example of the process utilized by the real estate auction system of the present invention, as shown in FIGS. 1B, 2A and 2B.

As illustrated in FIG. 13 is a flowchart illustrating the preferred functionality of an example of the information process 260 utilized by the real estate auction system of the present invention, as shown in FIGS. 1B, 2A and 2B. The info-process 260 is provided in order to provide general information to a user with regard to general information regarding the real estate auction system of the present invention. The information-process 260 also enables a user to establish a hyper-link to a pre-selected process for later usage.

First, the info-process is entered at step 261 and the general information and replace guidelines are then displayed at step 262. After the user identifies which functionality is desired, the user then replaces a hyperlink for the info-process with a selected hyper-link at step 263. This enables a user to determine what functionality is established for the access of the general information.

As illustrated in FIG. 14 is a flowchart illustrating the preferred functionality of an example of what it costs process utilized by the real estate auction system of the present invention, as shown in FIGS. 1B, 2A and 2B. The what it costs process 280 is a general information disclosure of the fees for utilization of the real estate auction system 40 of the present invention. These fees for utilization of the real estate auction system 40 are subject to future change. Upon selection of what it costs, the what it costs process 280 displays the what it costs page at step 281. The what it costs information is related to the cost or posting of properties for both residential and commercial properties.

Multiple posting programs (MPP) are offered for those people interested in auctioning a predetermined number of properties per time period. Price reductions based on the number of properties contracted to be posted or listed through the web site in a specified period of time. Such time periods include but are limited to quarterly, semi-annually, annually, etc.) Each level's contract has flexibility to move up or down to another level as business changes.

Figure 15:
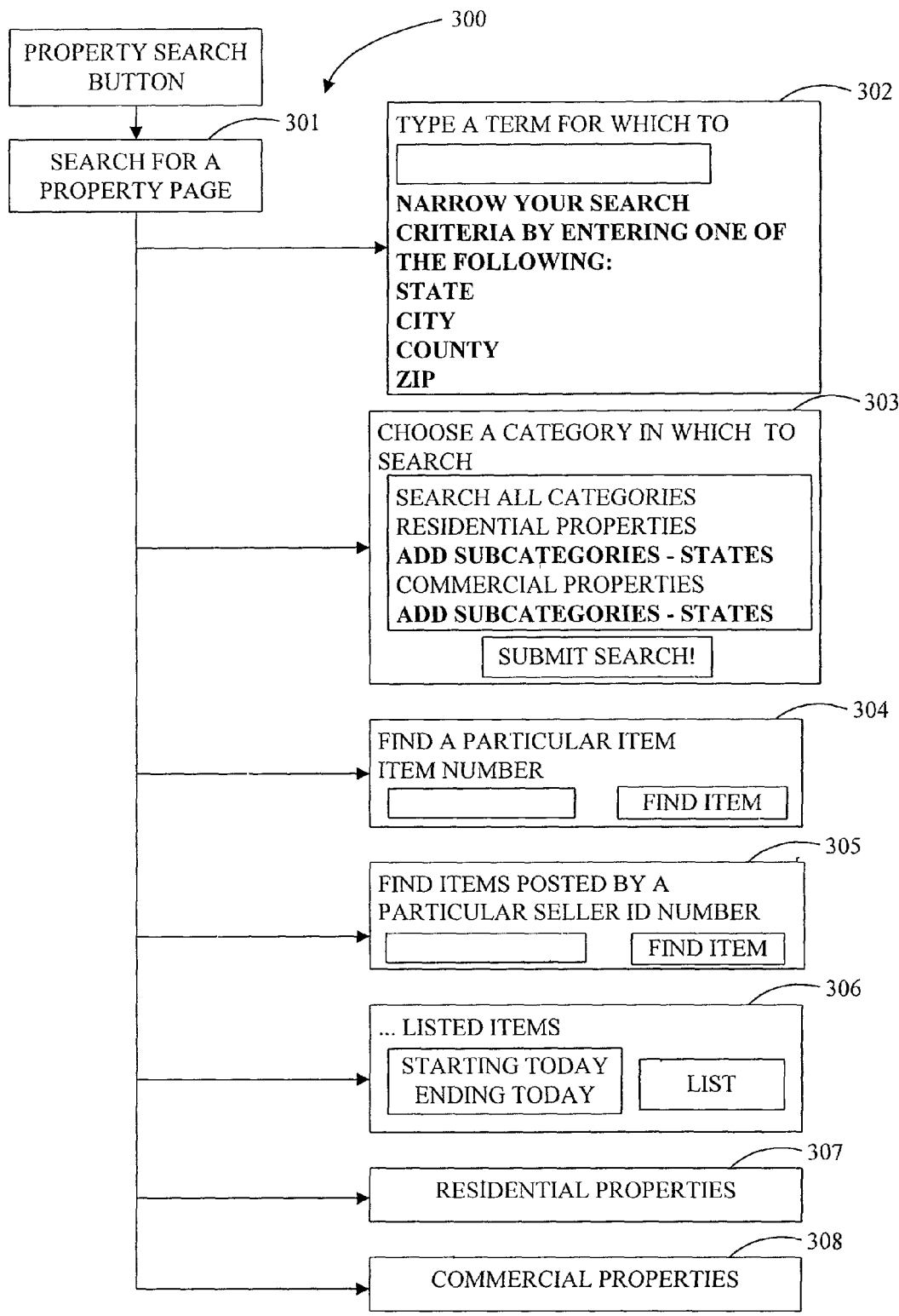
FIG. 15 is a flowchart illustrating the preferred functionality of an example of the property search process utilized by the real estate auction system of the present invention, as shown in FIGS. 1B, 2A and 2B.

As illustrated in FIG. 15 is a flowchart illustrating the preferred functionality of an example of the property search process 300 utilized by the real estate auction system of the present invention, as shown in FIGS. 1B, 2A and 2B. The property search process 300 provides members with the ability to search for particular types of properties either to be bought or sold.

First, upon selection of the property search process 300, is a display of the search for a property page at step 301. At step 301, it then determines which property is to be searched for. If it is determined at step 301 that a user wishes to perform a key word search, then the property search process 300 then proceeds to step 302 to enable a key word search.

However, if it is determined at step 301 that a user wishes to search by category, then the user proceeds to step 303 to search for properties within a particular selected category. Another type of search available to a user is a search by a particular item number.

If it is determined at step 301 that the user wishes to perform a search by a particular item number, then the user proceeds to step 304 to provide a search for a particular item by item number.

It is also possible to search for property utilizing a seller ID number. If is determined at step 301 that the user wishes to search for property by a particular seller id, then the property search process 300 then proceeds to step 305 to enable the user to perform a search by a particular seller ID number.

It is also possible to search for property by listed items. If it is determined at step 301 that the user request a search by listed items, then the property search process 300 then proceeds to step 306 to enable the search to identify the listed items in which to perform a search.

It is also possible to search properties in either all the residential or commercial properties areas. If it is determined at step 301 that the user wishes to perform either a residential or commercial property search, then property search process 300 then proceeds to step 307 to perform a residential property search or step 308 to perform a commercial property search.

Figure 16:
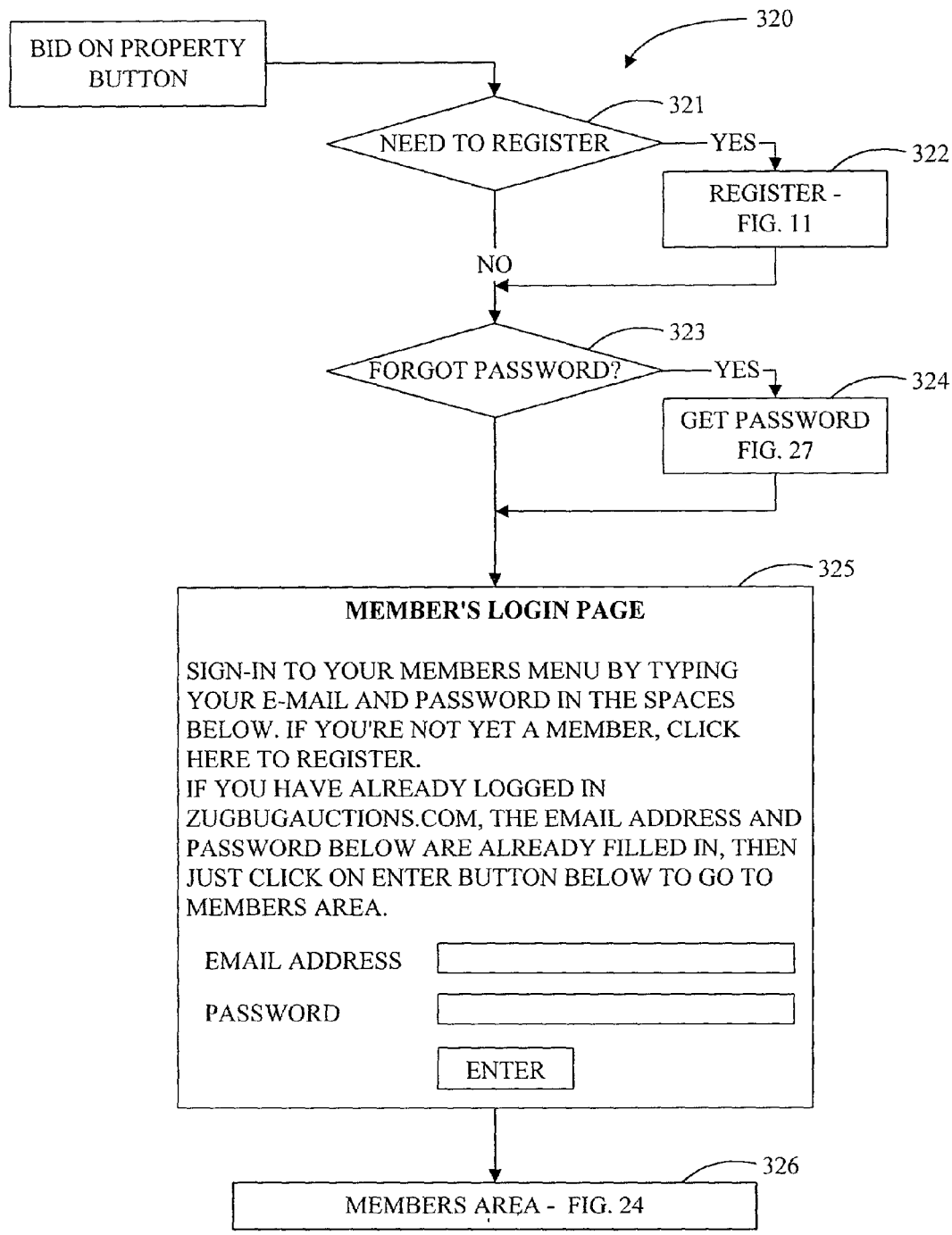
FIG. 16 is a flowchart illustrating the preferred functionality of an example of the bid on a property process utilized by the real estate auction system of the present invention, as shown in FIGS. 1B, 2A and 2B.

As illustrated in FIG. 16 is a flowchart illustrating the preferred functionality of an example of the bid on a property process 320 utilized by the real estate auction system of the present invention, as shown in FIGS. 1B, 2A and 2B. The bid on property process 320 allows a member to login and access the member area in order to bid on a property.

First, the bid on property process 320 determines if the member has registered and therefore is able to bid on a property at step 321. If it is determined at step 321 that the member is not unable to bid on property and therefore needs to register, then the bid on a property process 320 proceeds to step 322 in order to register the user. The user register was hereindefined with regard to FIG. 11 above. After performing register of the user at step 322 or if it is determined at step 321 that the user did not need to register, then the bid on a property process 320 then determines if the user has forgotten their password during login. If it is determined at step 323 that the user has forgotten their password, then the bid on a property process 320 proceeds to step 324 in order to enable the user to obtain their forgotten password.

After obtaining the needed password or if it is determined at step 323 that the password is not forgotten, then the bid on a property process 320 then enables the user to login at step 325. At step 325, the user enters their email address and password and then upon a valid password being entered is then transferred to the member area at step 326. The member area is hereindefined in further detail with regard to FIG. 24.

Figure 17:
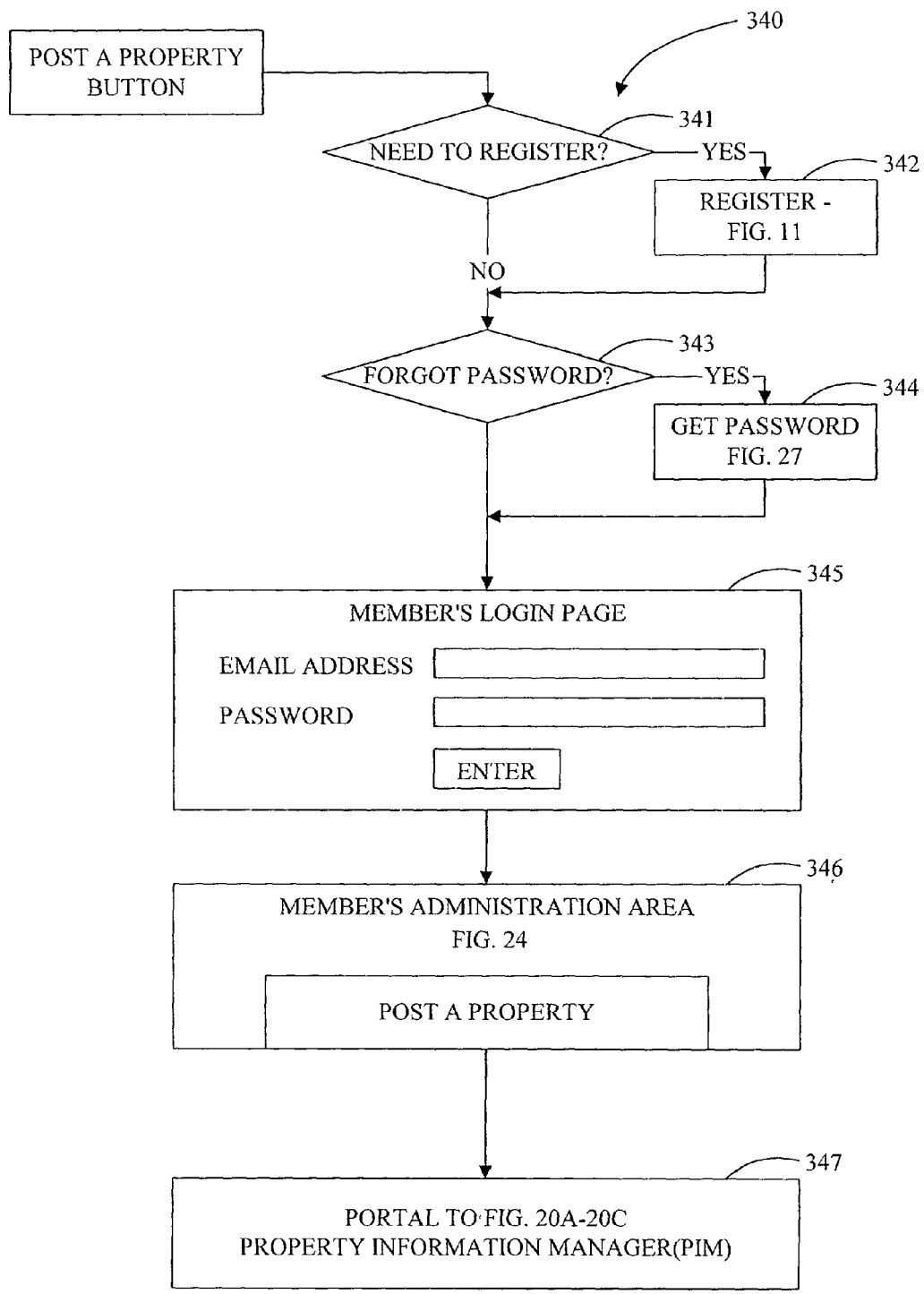
FIG. 17 is a flowchart illustrating the preferred functionality of the post a property process utilized by the real estate auction system of the present invention, as shown in FIGS. 1B, 2A and 2B.

As illustrated in FIG. 17 is a flowchart illustrating the preferred functionality of the post a property process 340 utilized by the real estate auction system of the present invention, as shown in FIGS. 1B, 2A and 2B. The post a property process 340 enables a member to post a property for auction. In order to post a property for auction, the post a property process 340 utilizes many of the other processes within defined herein.

First, the post a property process 340 determines if the user needs to register at step 341. If it is determined that the step 341 that the user does need to register, then the post a property process 340 proceeds to step 342 in order to register a user. The register a user process is hereindefined above in further detail with regard to FIG. 11. After registering a user or at step 342 or if it is determined at step 341 that the user does not need to register, then the post a property process 340 determines if the user has forgotten their password at step 343. If it is determined at step 343 that the user has forgotten their password, then the post a property process 340 proceeds to step 344 to get the password. The forget the password process is hereindefined in further detail with regard to FIG. 27. Getting the user password at step 344 or if it is determined at step 343 that the user has a valid password, then the post a property process 340 proceeds to step 345.

At step 345 the user performs the member login and upon successful completion proceeds to the members administration area at step 346. The members administration area is hereindefined in further detail with regard to FIG. 24. After performing the post a property process functionality within the members administration area at step 346, the post a property process 340 proceeds to step 347 to process the property information manager. The property information manger functionality is hereindefined in further detail with regard to FIGS. 20A-20C.

Figure 18:
FIG. 18 is a flowchart illustrating the preferred functionality of the resources portal process utilized by the real estate auction system of the present invention, as shown in FIGS. 1B, 2A and 2B.

As illustrated in FIG. 18 is a flowchart illustrating the preferred functionality of the real estate resources process 360 utilized by the real estate auction system 40 of the present invention, as shown in FIGS. 1B, 2A and 2B. The real estate resources process 360 is provided in an attempt to provide more general information to all users of website. The real estate resources process 360 has numerous links to different information sources and real estate services at other locations on the network. Upon selection of the real estate resources process 360 at step 361, the resources contained in this system are displayed at 362. These resources at 362 are normally hyperlinks to resources located at other locations.

Figure 19:
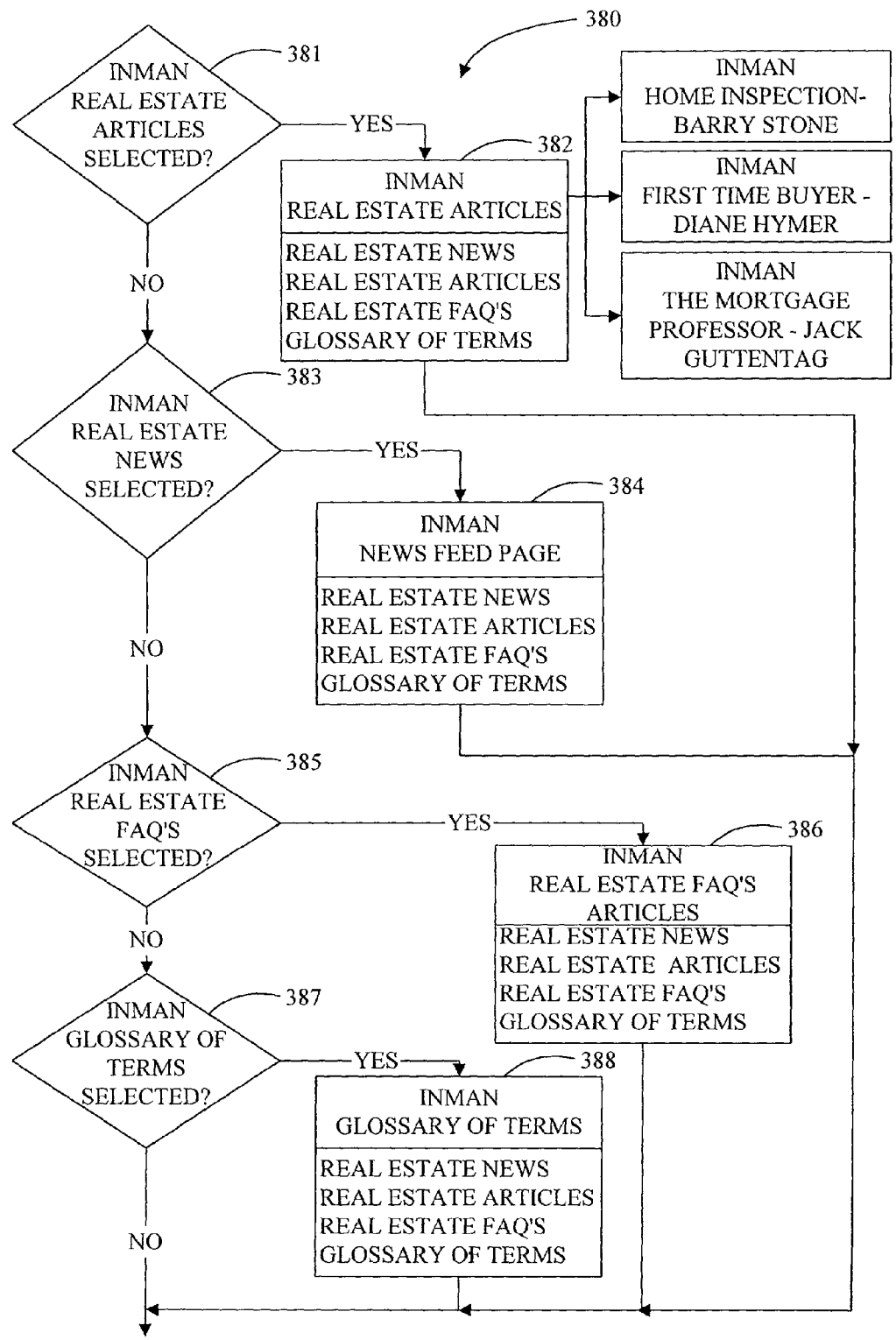
FIG. 19 is a flowchart illustrating the preferred functionality of the real estate information process utilized by the real estate auction system of the present invention, as shown in FIGS. 1B, 2A and 2B.

The hyperlinks are incorporated in the site to provide ease to users while they are using the site and also as a resource (i.e. a resource tools page) for buying services they may need in order to do due diligence and close a real estate transaction. The provider of the real estate auction system 40 of the present invention, includes and removes hyperlinks or services as necessary to provide the most comprehensive resources as possible to provide customer quality assurance. In some instances, agreements are in place where the provider of the real estate auction system 40 of the present invention, collects revenue from the linked service provider. These resource providers provide for different levels of revenue including revenue sharing, number of orders placed and referral fees. As illustrated in FIG. 19 is a flowchart illustrating the preferred functionality of the real estate information process 380 utilized by the real estate auction system of the present invention, as shown in FIGS. 1B, 2A and 2B. The real estate information process 380 provides selected real estate documents to users of the real estate auction system of the present invention.

First, the real estate information process 380 determines if the user has selected real estate articles at step 381. If it is determined at step 381 that the user has selected real estate articles for display, then the real estate information process 380 proceeds to step 382 to deliver the real estate articles. Part of the real estate articles that are available include those articles from a home inspector, first time buyer, and mortgage professor. After displaying these selected real estate articles, the real estate information process 380 then returns.

However, if it is determined at step 381 that the real estate articles were not selected, then the real estate information process 380 determines if real estate news items were selected at step 383. If it is determined at step 383 that the real estate news were selected, then the real estate information process 380 proceeds to step 384 to provide the selected news feed items. After providing these selected news feed items, the real estate information process 380 then exits.

However, if it is determined at step 383 that the real estate news items were not selected, then the real estate information process 380 determines if real estate frequently asked questions were selected at step 385. If it is determined at step 385 that the real estate frequently asked questions were selected, then the real estate information process 380 proceeds to step 386 to provide the real estate frequently asked questions article selected. After providing these frequently asked questions article, the real estate information process 380 then exits.

However, if it is determined at step 385 that the real estate frequently asked questions were not selected, then the real estate information process 380 then determines if a glossary of terms were selected at step 387. If it is determined at step 387 that the glossary of terms were selected, then the real estate information process 380 provides the selected glossary of terms at step 388 and then exits.

Figure 20A:
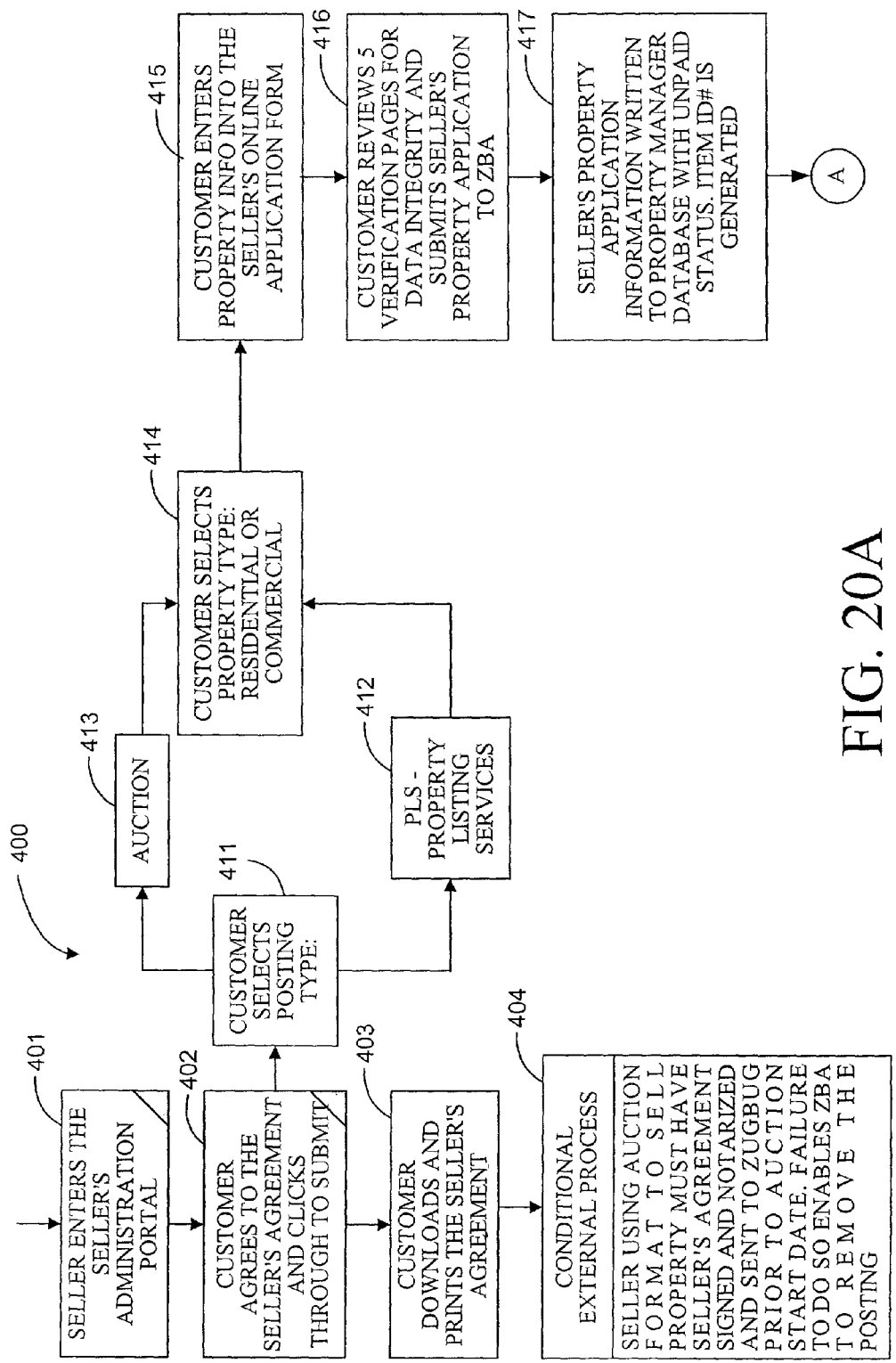
FIGS. 20A-20C illustrates the preferred functionality of the property information manager process utilized by the real estate auction system of the present invention, as shown in FIGS. 1B, 2A and 2B.
Figure 20B:
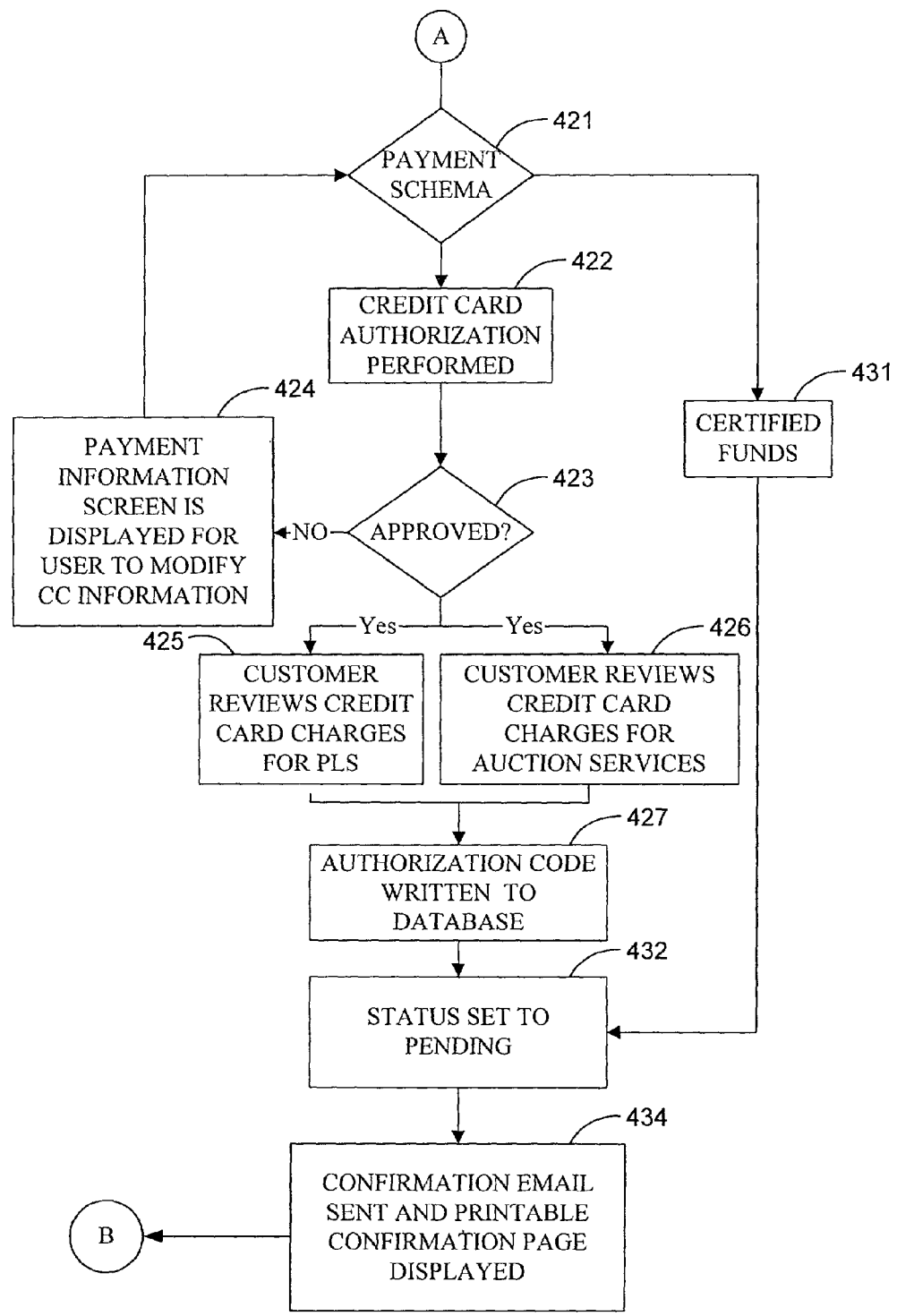
Figure 20C:
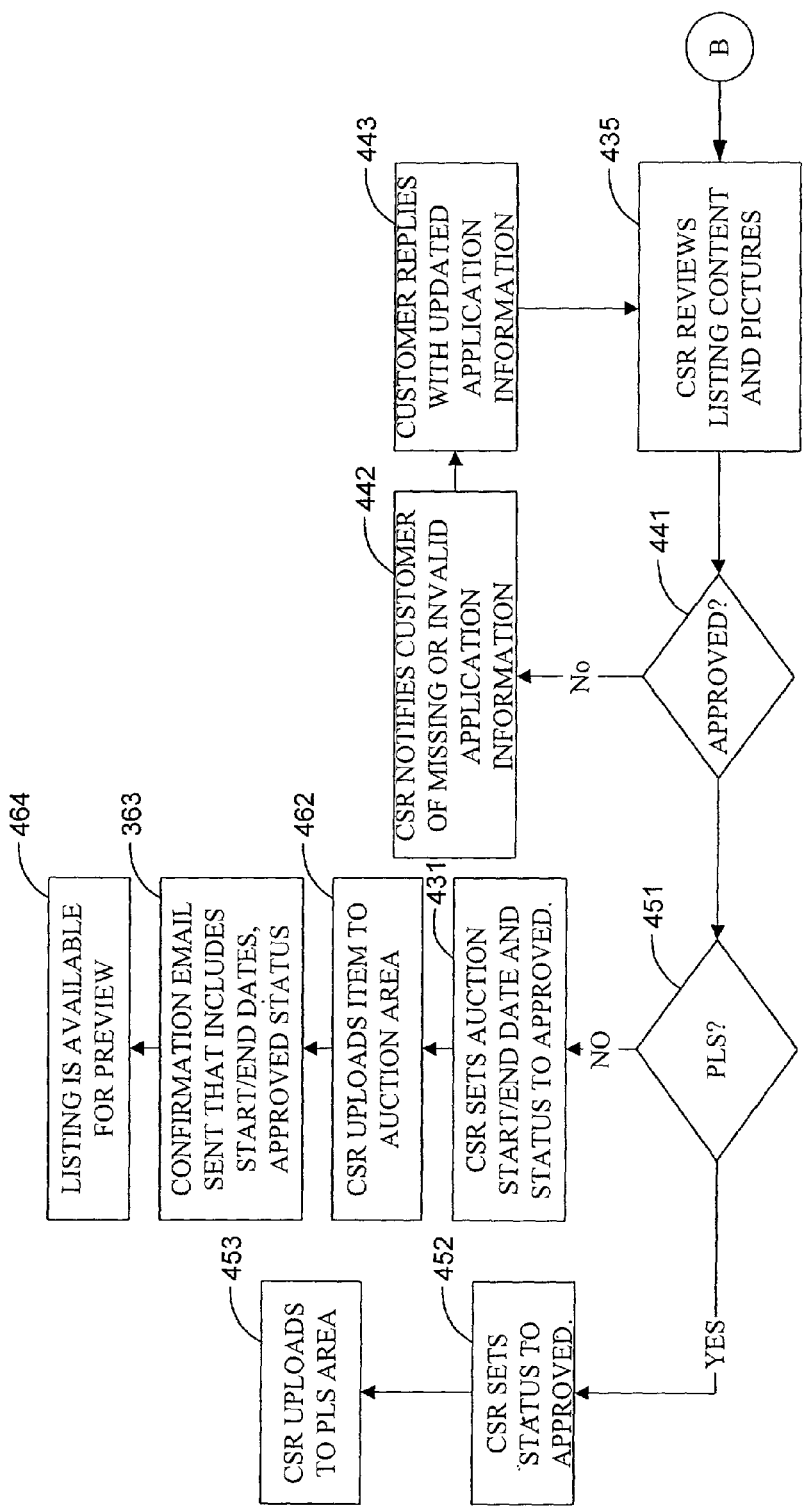

As illustrated in FIGS. 20A-20C illustrates the preferred functionality of the property information manager process 400 utilized by the real estate auction system of the present invention, as shown in FIGS. 1B, 2A and 2B. The property information manager process 400 controls the members ability to setup properties for access on the real estate auction system of the present invention and to elect whether to add a Buy Now feature or not. The property information manager process 400 also provides for the payment contract and confirmation of properties posted to the real estate auction system 40.

In operation, the property information manager process 400 first allows the seller to enter the sellers administration portal at step 401. At step 402, the customer agrees to the seller's agreement and clicks through the agreement to indicate acquiescence to the seller's agreement terms. At step 403, the customer downloads and prints the seller's agreement and step 404 is a conditional external process which entails having the seller's agreement signed, notarized and returned to the providers of the real estate auction system 40 for enabling the posting of the property. Also, after step 402, the property information manager process 400 then allows the customer to select the posting type at step 411.

If it is determined at step 411 that the posting type is to the property listing service product, then the property information manager process 400 then promptly lists the property with the property listing service at step 412. However, if it is determined at step 411 that the customer posting selecting type is on-line auction, then the property information manager process 400 then proceeds to step 413 to indicate that the property is to be auctioned. At step 414, the customer selects the property type to be auctioned. This step also takes place before going to the PLS because this is where the extensive data, 133 plus data fields that feed the auction and PLS is entered by the internet or offline special program by the seller.

This property type includes, but is not limited to, residential, commercial, and the like. These data fields may include, but is not limited to, auction start and end date as well as auction status. Also included is the property location information, such as for example but not limited to, address, city, state, zip, county and whether or not the property is within a particular city limit. Information about the owner is included including the owner's full name, address, city, state, zip, e-mail, and phone number. Also included is information regarding the start price, bid increments, and reserve price. Additional information regarding the property description including but is not limited to, the property description describing the location of the property, property class, type, approximate size, lot size, and age of the property. More specific information may be included regarding the property including the age of roof, the structure, description of land (i.e., slope, grade, landscape or other like descriptions). Utility information mail is included such as sewer, water source, any septic tank gas, electricity, land usage or encompasses. Information regarding other utilities includes whether or not irrigation resides on the property, water sources, energy management, whether or not spaces are divided, whether the property has a chiller or boiler, age of any cooling tower of the property or elevators, how many elevators, whether or not there is a freight elevator, the electrical capacity of the building, whether it's a multi-floor building and whether or not each floor has its own heater/chiller or air conditioning unit, and whether or not a loading dock is available. More specific information regarding the property includes the property specs, including the number of floors, bedrooms, baths, fireplaces, and garages. Other property spec information may also include the neighborhood description, basement description, financial structural special stipulations, zoning or other type of disclosures. Additional optional information may also be included, including any appraisals, termite bond, title search, tax assessment, home warranty or the like. Additional information regarding the property includes bidder contact information, method of contact including by phone number, e-mail, mail address, city, state, zip code and hours preferred. Additional including closing date, time after auction is closed, how many preview weeks, any closing attorney of the buyer or seller, contingencies and the like. Also included may be additional property information, location, description, and recorded tax description such as a tax ID. Information regarding any potential bids including credit card information would require the credit card number, expiration information, month, date, year, type of credit card, billing address, name on the card, address of the cardholder, city of the cardholder, state of the cardholder, and the like. Additional information may be included such as whether or not interviews are possible, lease review, tenant estoppels, parking ratio, number of floors, whether or not it's a multi-tenant property and the occupancy rate may also be included information. Virtual tour information may also be provided and would provide textual descriptions of pictures of the significant features of the property. Images depicting the property may also be included so that the potential bidder may visualize the property in question to confirm that a property is the one in which a bidder may wish to bid on but to also review the characteristics of the property. Additional information may include any optional images that may be utilized in either the virtual tour or for general disclosure information.

The seller whether they are using the PLS or going to auction must go through steps 415 to 417, then it is written to the auction page or the PLS page. Once the data has been entered and reviewed it is then written to the database and the appropriate auction or PLS page.). At step 415, the customer enters the property information into the seller's on-line application form. After entering the information into the seller's on-line application form at step 415, then the property information manager process 400 provides the capability for the user to review the verification pages for data integrity. After verifying the data integrity, the property information manager process 400 then submits the seller's property application to the providers of the real estate auction system 40. At step 417, the seller's property application information is written into the property manager's database with unpaid status, item ID number, and an item ID number is generated.

At step 421, the property information manager process 400 then determines the payment type. If it is determined at step 421 that the payment is to be via certified funds, then the property information manager process 400 then proceeds to step 431 to process the certified funds. After processing the certified funds at step 431, the real estate information manager process 400 proceeds to step 432.

However, if it is determined in step 421 that the payment type is credit card, then the property information manager process 400 proceeds to step 422 to perform the credit card authorization. After the credit card authorization step is performed at step 422, the property information manager process 400 determines if the credit card transaction was approved at step 423. If it is determined at step 423 that the credit card transaction was not approved, then the property information manager process 400 proceeds to step 424 where the payment information screen is displayed for the user to modify the credit card information and then returns the user to step 421. However, if it is determined in step 423 that the credit card transaction was approved, then the customer reviews the credit card charges for either the property listing service in step 425 or the auction service in step 426. After reviewing the credit card charges at step 425 or 426, then the property information manager process 400 then writes the authorization code of the credit card transaction to a database at step 427.

At step 432, the property information manager process 400 sets the status to pending. At step 434, the property information manager process 400 send a confirming email and printable confirm pages displayed to the user that the transaction was successfully completed. At step 435, the customer service reviews the listing content and pictures.

After reviewing the listing contents and pictures, the customer service then determines if the listing content and pictures are approved at step 441. If it is determined at step 441 that the listing content and/or pictures are not approved, then the customer service representative notifies the customer of the missing or invalid application information at step 442 and waits for the customer to reply. The customer then replies at step 443 with the updated application information then the property information manager process 400 then returns to repeat steps 435 and 432.

However, if it is determined in step 441 that the listing content and pictures are approved then the property information manager process 400 then determines if the property type is a property listing service at step 451. If it is determined at step 451 that the property listing is to be listed with the property listing service, then the customer service representative sets the status to approve at step 452 and upload the listing content and pictures into the property listing service area at step 453.

However, if it is determined at step 451 that the listing type is not the property listing service, then the customer service representative sets the auctions start/end date and sets the status to approve at step 461. Then the customer service representative uploads the item into the auction area at step 462 and a confirmation email is sent to the user that includes the start/end date of the auction and the approved status at step 463. At step 464 the listing is then available for preview.

Figure 21:
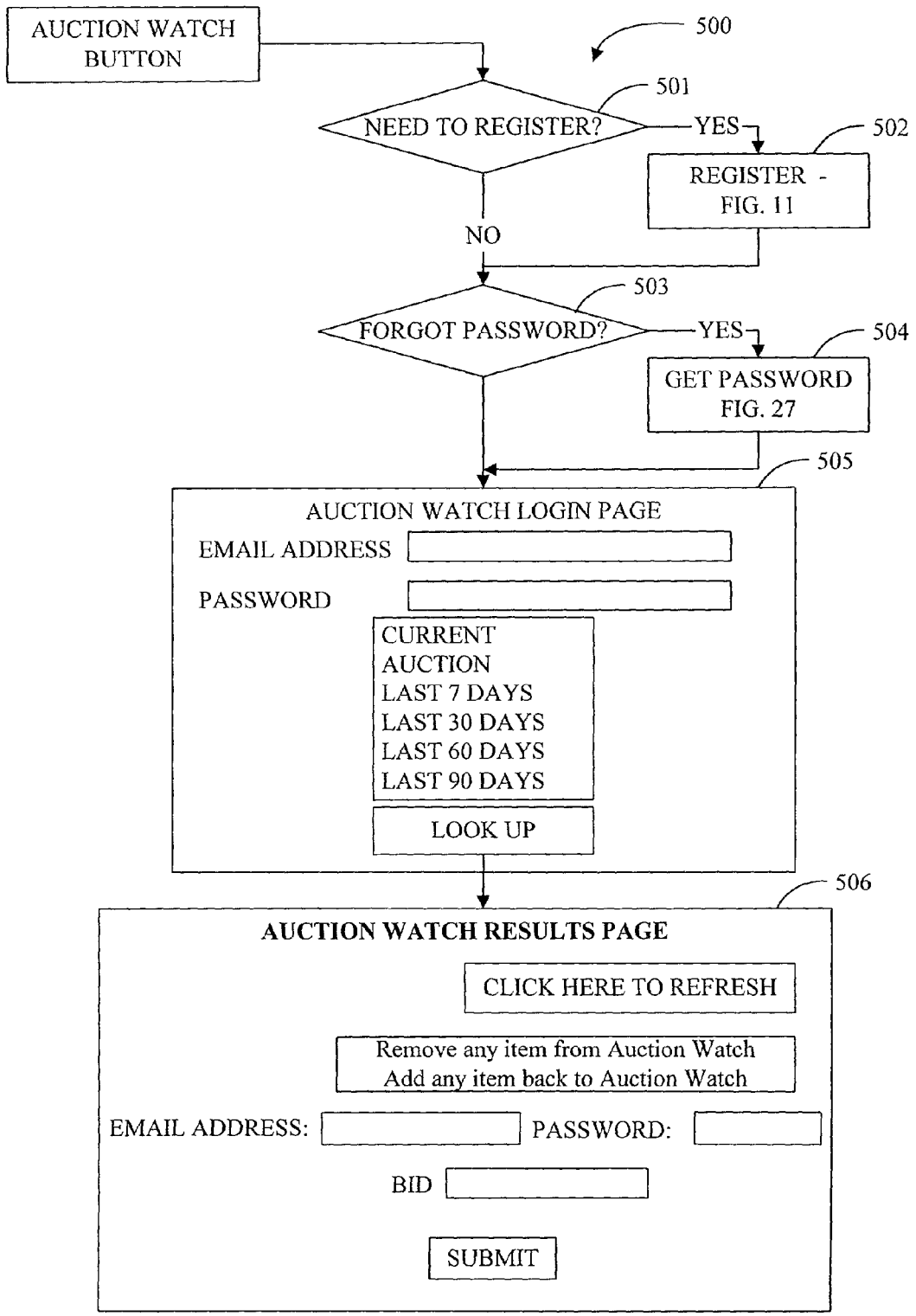
FIG. 21 is a flowchart illustrating the preferred functionality of the Auction watch process utilized by the real estate auction system of the present invention, as shown in FIGS. 1B, 2A and 2B.

As illustrated in FIG. 21 is a flowchart illustrating the preferred functionality of the auction watch process 500 utilized by the real estate auction system of the present invention, as shown in FIGS. 1B, 2A and 2B. The auction watch process 500 provides the user the ability to monitor those auctions that have occurred within a pre-selected time period.

First, the auction watch process 500 determines if the user needs to register at step 501. If it is determined at step 501 that the user needs to register, then the auction watch process 500 proceeds to step 502 to register the user. The register user functionality is herein described above with regard to FIG. 11. After registering the user at step 502 or if the user does not need to be registered at step 501, then the auction watch process 500 determines if the user forgot their password at step 503. If it is determined at step 503 that the user did forget their password, then the auction watch process 500 enables the user to get their password at step 504.

After user has obtained their password at step 504 or if it is determine at step 503 that the user did not forget their password, then the user enters the auction watch login page at step 505. At this time, the user inputs their email address, password and indicates the auction period to be reviewed. At step 506, the auction watch results pages displayed and includes the properties within the selected auction period. This auction watch results page displayed at step 506 also includes the ability for the user to input their email address, password, and a property in which they wish to submit a bid. The bids then can be submitted from the auction watch result page displayed at step 506.

In the preferred embodiment, properties will have a rolling 6-month auction format with two weeks preview and two weeks live auction. If a property does not sell during the initial auction period, it may be re-posted by paying a re-posting fee. This fee must be paid before the property can be posted for an additional auction period. This payment may be made using a credit card or by certified funds. A customer service representative may contact the seller to re-post the property.

Figure 22:
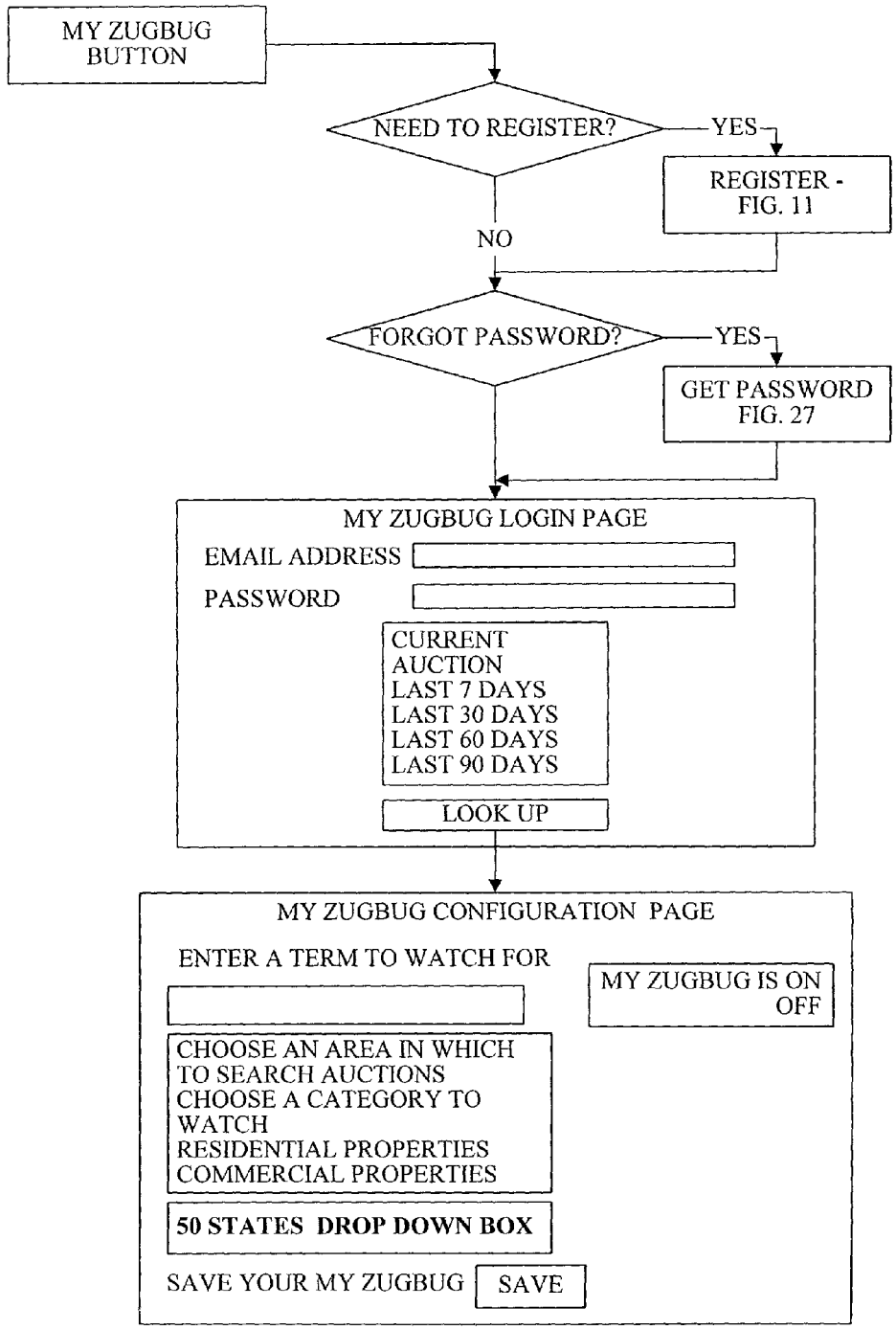
FIG. 22 is a flowchart of the preferred functionality of the My Zugbug login and configuration process utilized by the real estate auction system of the present invention, as shown in FIGS. 1B, 2A and 2B.

As illustrated in FIG. 22 is a flowchart of the preferred functionality of the MYZugbug login and configuration process 520 utilized by the real estate auction system of the present invention, as shown in FIGS. 1B, 2A and 2B. The MYZugbug login and configuration process 520 is much like the auction watch process discussed in FIG. 21; however, the MYZugbug login and configuration process 520 allows the user to further search for unique terms within the product listing displayed within a pre-selected time period.

First, the MyZugbug login and configuration process 520 determines if the user is already registered at step 521. If it is determined at step 521 that the user does need to register, then the MyZugbug login and configuration process 520 then proceeds to step 522 to enable the user to register. The register functionality has been herein described with regard to FIG. 11. If it is determined at step 521 that the user does not need to register or after the user has successfully registered at step 522, then the MyZugbug login and configuration process 520 then determines if the user has forgotten their password. If it is determined at step 523 that the user has forgotten their password, then the MyZugbug login and configuration process 520 then proceeds to step 524 to enable the user to get their password. The functionality to enable a user to get their password is herein described in further detail with regard to FIG. 27.

If it is determined at step 523 that the user has not forgotten their password or if the user has obtained their password at step 524, then the MYZugbug login and configuration process 520 allows the user to logon at step 525. During logon the MYZugbug login and configuration process 520 also allows the user to indicate the time period in which to review properties up for auction. After selecting the properties desired for review at step 525, then the MyZugbug login and configuration process 520 then proceeds to the Zugbug configuration page at step 526.

At step 526, the MyZugbug login and configuration process 520 then allows the user to further narrow the properties selected by entering a term to watch for in the properties themselves. This term to watch for in the property listing includes, but is not limited to, choosing an area in which to search for auctions, choosing a category to watch such as, but not limited to residential or commercial properties. After entering the information in the MyZugbug configuration pages at step 526, the information is then saved.

Figure 23:
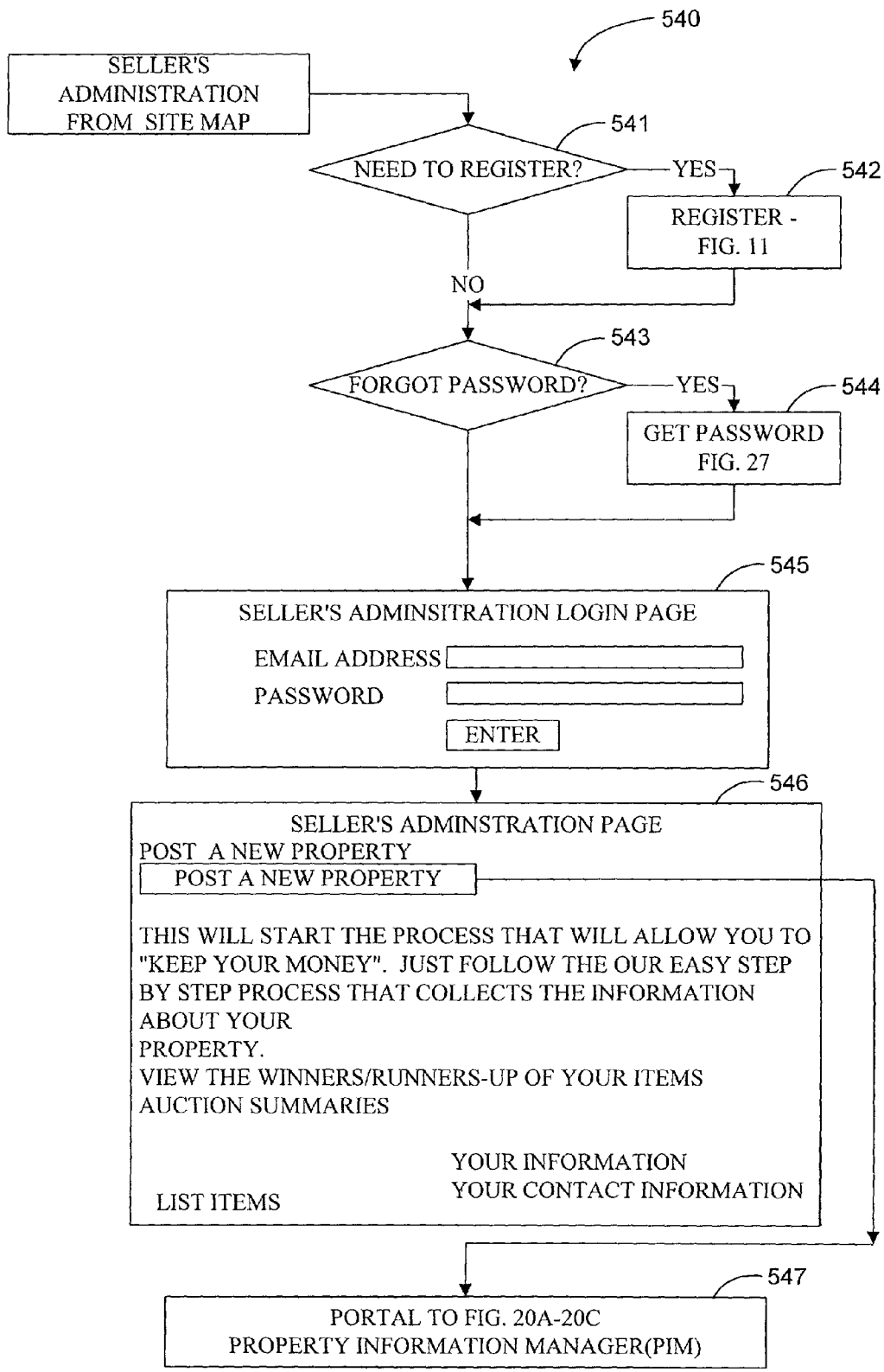
FIG. 23 is a flowchart illustrating the preferred functionality of the sellers administration process utilized by the real estate auction system of the present invention, as shown in FIGS. 1B, 2A and 2B.

FIG. 23 is a flowchart illustrating the preferred functionality of the seller administration process 540 utilized by the real estate auction system of the present invention, as shown in FIGS. 1B, 2A and 2B. The seller administration process 540 provides the seller with a means to obtain information regarding the property up for sale.

First, the seller administration process 540 determines if the seller needs to register at step 541. If it is determined at step 541 that the seller does need to register, than the seller administration process 540 proceeds to step 542 to enable the seller to register. The registration functionality is hereindefined in further detail above with regard to FIG. 11. However, if it is determined at step 541 that the seller has already registered or after the seller has completed the registration process at step 542, then the seller administration process 540 then determines if the seller has forgotten their password at step 543. If it is determined at step 543 that the user has forgotten their password, then the seller administration process 540 then proceeds to step 544 to enable the user to get their password. The functionality to enable the user to get their password is hereindefined in further detail with regard to FIG. 27.

However, if it is determined at step 543 that the user has not forgotten their password or if after obtaining their valid password at step 544 then the user proceeds to the sellers administration logon page of step 545. The user then needs to input their email address, password, and then transmits the data. After receiving a valid email address and password, the seller administration process 540 then displays the seller administration page at step 546. The seller administration page allows the user to post a new property, obtain auction summaries, property information, contact information, and items for sale.

If the user selects the functionality to post a new property, then the sellers administration process 540 then proceeds to step 547 to enable the user to access the property information manager. The property information manager is herein described in further detail with regard to FIGS. 20A-20C.

Figure 24:
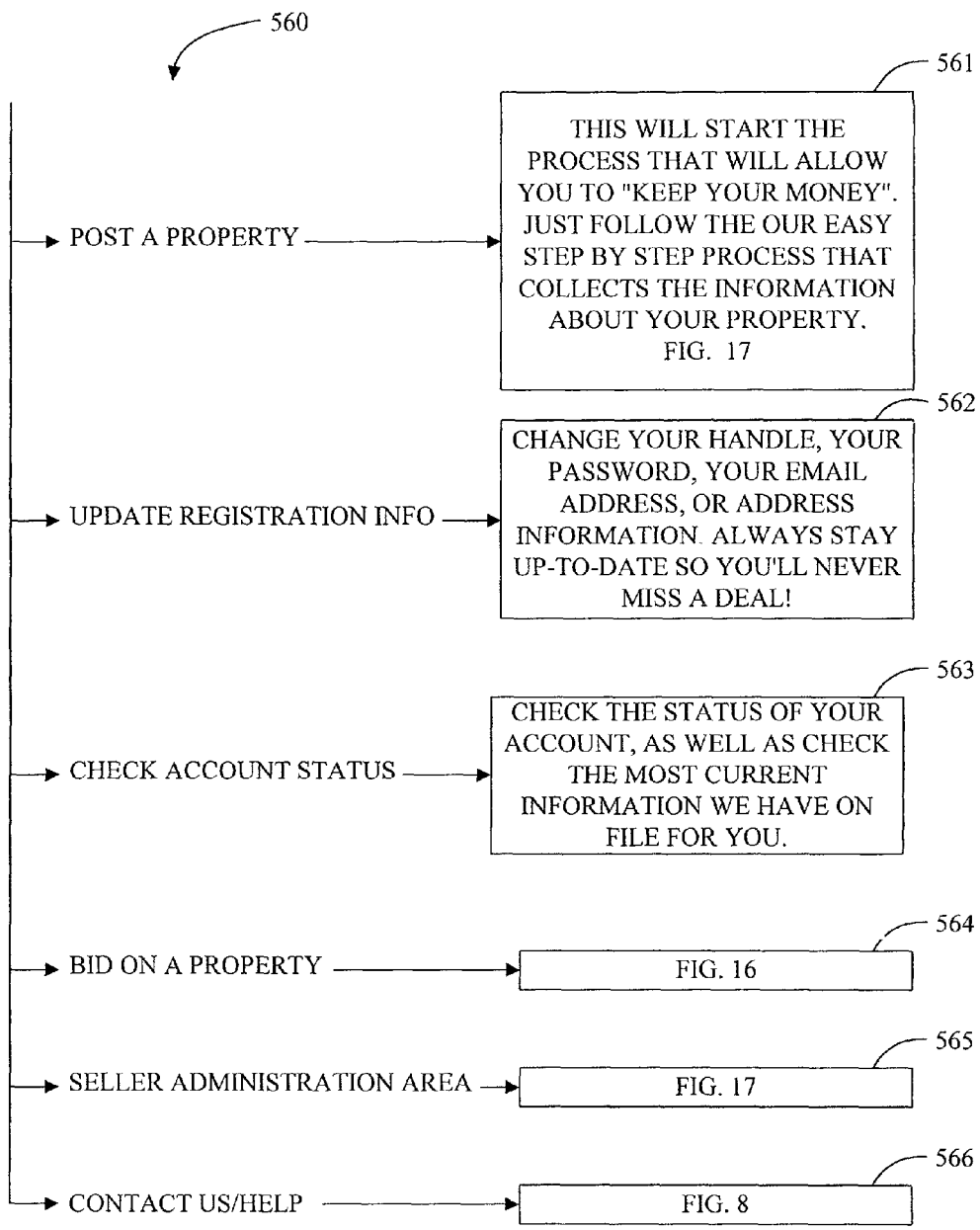
FIG. 24 is a flowchart illustrating the preferred functionality of the members administration process utilized by the real estate auction system of the present invention, as shown in FIGS. 1B, 2A and 2B.

As illustrated in FIG. 24 is a flowchart illustrating the preferred functionality of the members administration process utilized by the real estate auction system of the present invention, as shown in FIGS. 1B, 2A and 2B. As illustrated in FIG. 24 is a flowchart illustrating the preferred functionality of the members administration process 560 utilized by the real estate auction system of the present invention, as shown in FIGS. 1B, 2A and 2B. The members administration process 560 provides links throughout the system in order for the member to perform the required functions for posting or bidding on a property.

First the members administration process 560 determines the functionality requested by the member. If it is determined that the member wishes to post a property then the members administration process 560 proceeds to post to property at step 561. This will start the process that allows the user to complete the posting of the property. This functionality is herein described in further detail above with regard to FIG. 17.

However, if it is decided by the members administration process 560 that the member wishes to update their registration information, then the members administration process 560 proceeds to step 562 to allow the user to modify registration information. When performing the registration update, the user may update their handle, password, e-mail address or address information. The update registration information processes herein described in further detail with regard to FIG. 25.

However, if it is determined by the members administration process 560 that the member wishes to check their account status, then the user proceeds to step 563. At step 563 the user can perform those account status check as well as check the most current information of the member on the real estate auction system of the present invention.

However, if it is determined by the members administration process 560 that the user wishes to bid on the property then the user proceeds to step 564 to bid on a property. Step 564 takes the user to bid on a property process herein defined in further detail with regard to FIG. 16.

Other services provided by the members administration process 560 are the ability for the seller to perform administration services on the seller's profile. This functionality is provided by proceeding to the seller administration process herein defined above in further detail with regard to FIG. 23.

The members administration process 560 also may provide a link to helpful information to the user by connecting the user to the "contact us" functionality. The "contact us" information is accessible utilizing the contact us process herein defined above with regard to FIG. 8.

Figure 25:
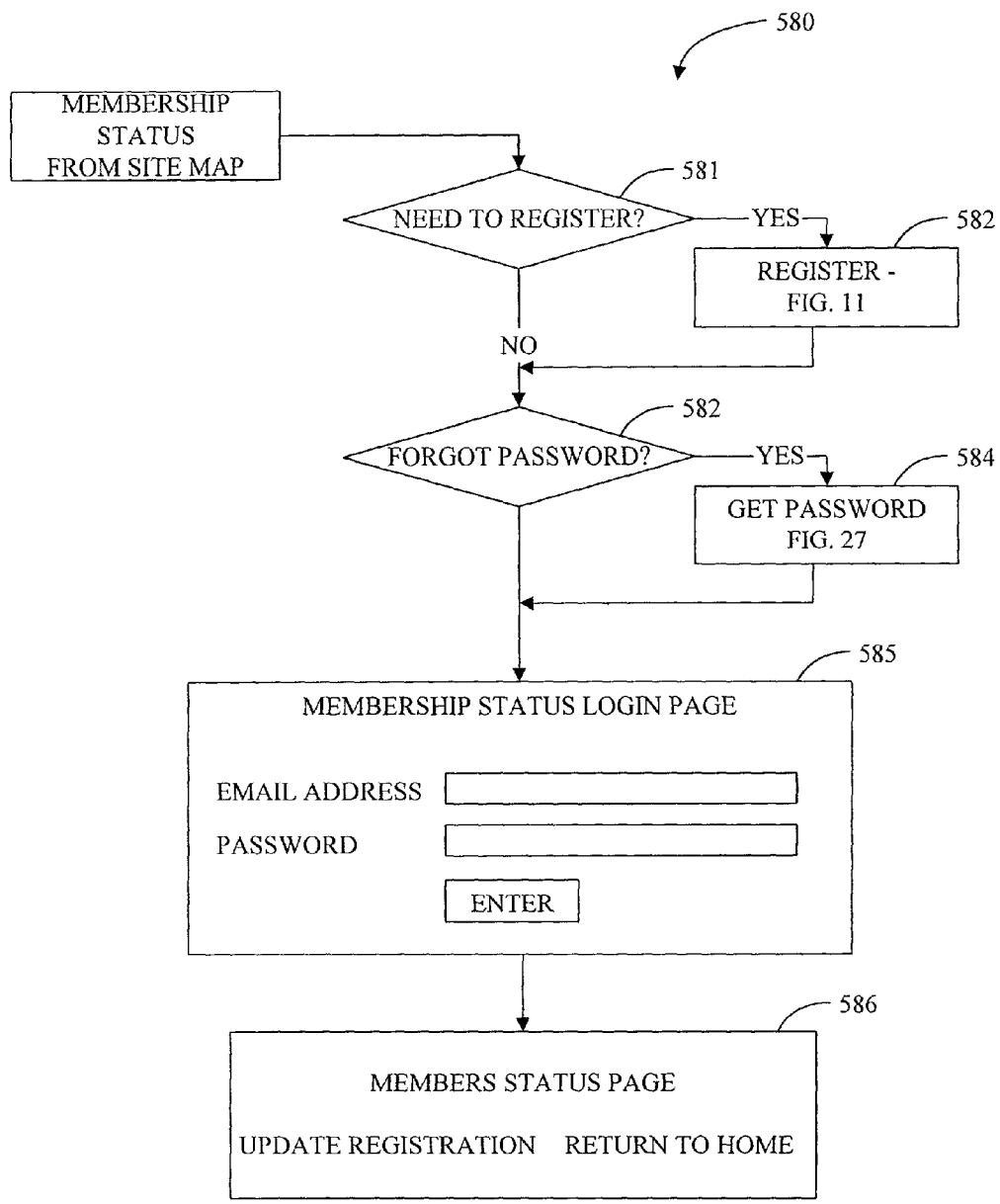
FIG. 25 is a flowchart of the preferred functionality of the membership status process utilized by the real estate auction system of the present invention, as shown in FIGS. 1B, 2A and 2B.

As illustrated in FIG. 25 is a flowchart of the preferred functionality of the membership status process utilized by the real estate auction system of the present invention, as shown in FIGS. 1B, 2A and 2B. As illustrated in FIG. 25 is a flowchart of the preferred functionality of the membership status process 580 utilized by the real estate auction system of the present invention, as shown in FIGS. 1B, 2A and 2B. The membership status process 580 provides functionality to connect the user with the ability to review their current status information and update that information that needs to be updated.

First, the membership status process 580 determines if the user needs to register in order to access account information at step 581. If it is determined that the user does need to register then the membership status process 580 proceeds to step 582 and connects the user with the registration process herein defined above with regard to FIG. 11. After registering at step 582 or if it is determined that the user does not need to register at step 581, then the membership status process 580 then determines if the user has forgotten their password at step 583. If it is determined at step 583 that the user has forgotten their password, the user then proceeds to step 584 to get their password. This get password functionality is enabled by utilizing the forgot password process herein defined below in detail with regard to FIG. 27.

After obtaining the correct password at step 584 or if it is determined at step 583 that the password is known, then the membership status process 580 proceeds to step 585 to allow the user to log in. The user provides the log in for the membership status process 580 by providing their e-mail address and password. Upon validation of this information the user then proceeds to the membership status page at step 586. Once the member is in the membership status page, the member may review their status information and update their registration information if so desired.

Figure 26:
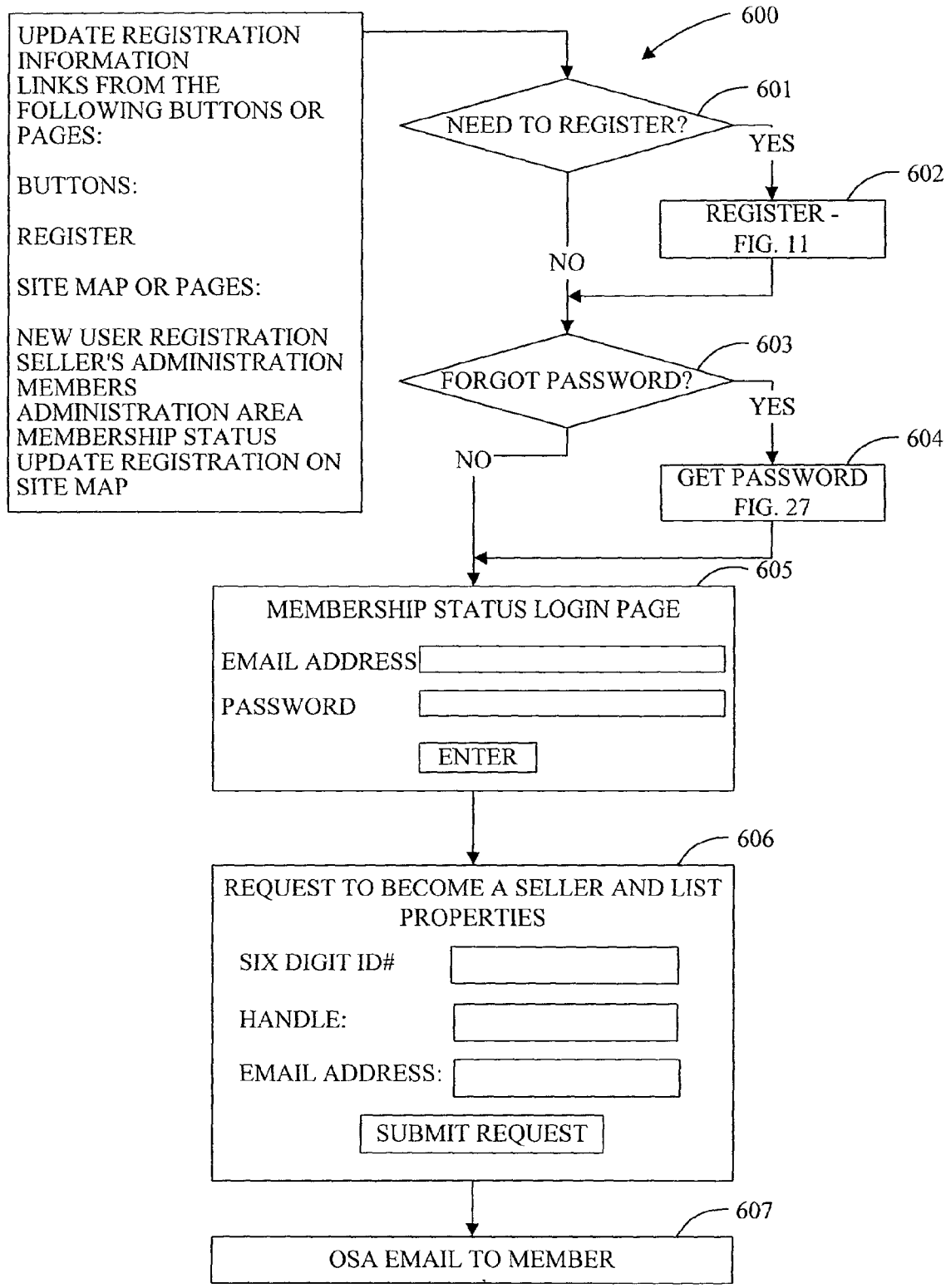
FIG. 26 is a flowchart illustrating the preferred functionality of an example of the update registration process utilized by the real estate auction system of the present invention, as shown in FIGS. 1B, 2A and 2B.

As illustrated in FIG. 26 is a flowchart illustrating the preferred functionality of an example of the update registration process utilized by the real estate auction system of the present invention, as shown in FIGS. 1B, 2A and 2B. As illustrated in FIG. 26 is a flowchart illustrating the preferred functionality of an example of the update registration process 600 utilized by the real estate auction system of the present invention, as shown in FIGS. 1B, 2A and 2B. The update registration process 600 provides for the ability of updating a members status information.

The update registration process 600 first determines if the user is registered at step 601. If it is determined at step 601 that the user is not registered, then the update registration process 600 proceeds to step 602 to complete the registration functionality. The registration functionality for a new member is herein defined in further detail above with regard to FIG. 11. After completing the registration at step 602 or if it is determined at step 601 that registration functionality need not be performed, then the update registration process 600 proceeds to step 603 to determine if the user currently knows their valid password. If it is determined at step 603 that the user does know their valid password then the update registration process 600 proceeds to step 604 to enable the member to get their password. To get password functionality is herein described in further detail with regard to FIG. 27.

After obtaining the password for the user at step 604 or if it is determined at step 603 that the user knows their valid password, then the update registration process 600 then proceeds to the membership status logon pages at 605 for the user to input their e-mail address and password. After the login page has been successfully completed, then the user proceeds to step 606 to become a seller and list properties. The information collected at step 606 includes the user's id number, handle and e-mail address. After completing the registration to become a seller and list properties, the update registration process 600 then e-mails the seller a confirmation of the process.

Figure 27:
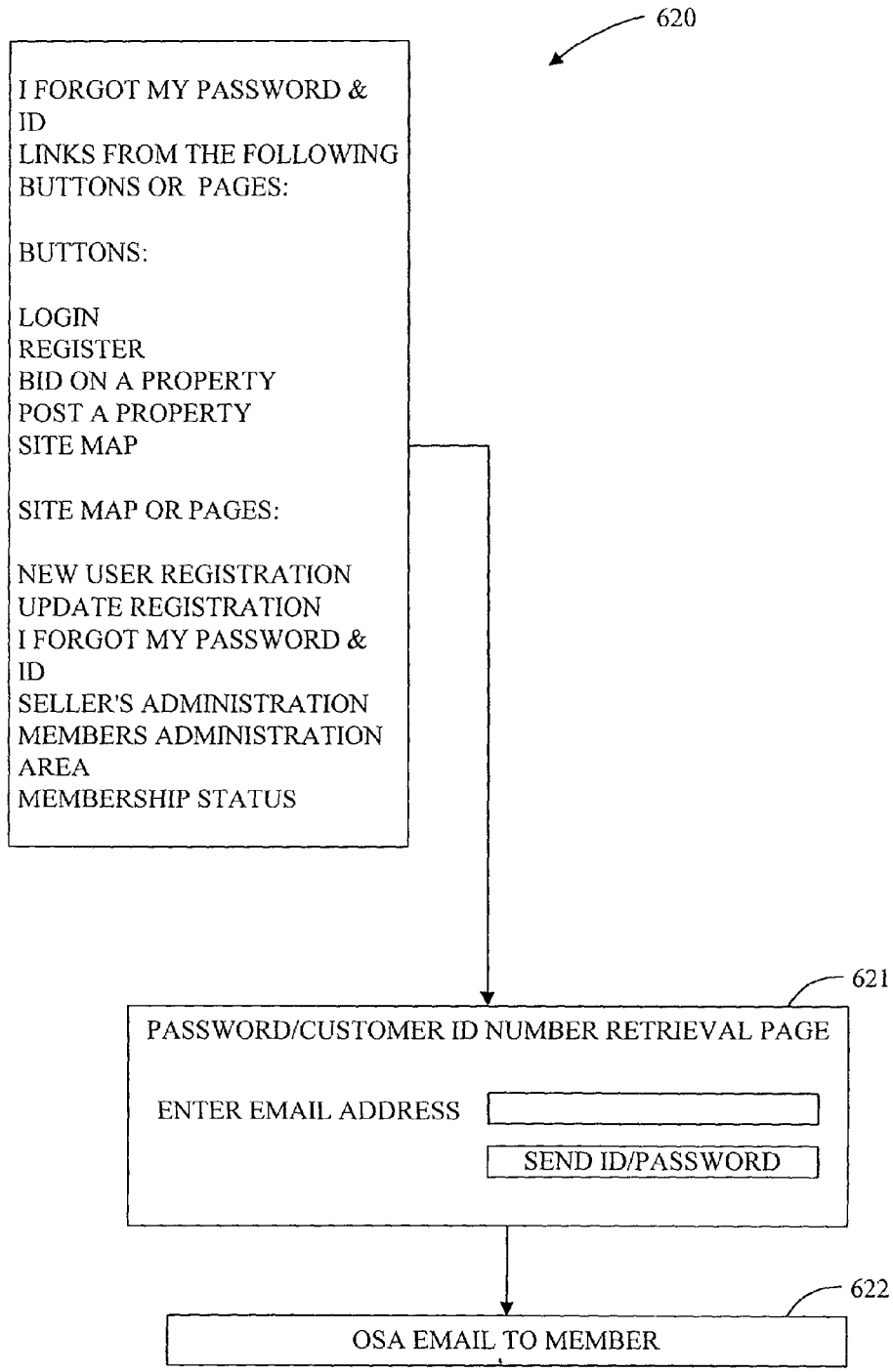
FIG. 27 is a flowchart illustrating the preferred functionality of an example of the forgot password process utilized by the real estate auction system of the present invention, as shown in FIGS. 1B, 2A and 2B.

As illustrated in FIG. 27 is a flowchart illustrating the preferred functionality of an example of the forgot password process utilized by the real estate auction system of the present invention, as shown in FIGS. 1B, 2A and 2B. As illustrated in FIG. 27 is a flowchart illustrating the preferred functionality of an example of the forgot password process 620 utilized by the real estate auction system of the present invention, as shown in FIGS. 1B, 2A and 2B. The forgot password process 620 enables a user to obtain their password for their e-mail address. The forgot password process 620 may be entered from a number of other processes that require the user to log in.

At step 621, the user inputs their e-mail address and sends it to the forgot password process 620. Upon receiving the e-mail address, the forgot password process 620 validates the e-mail address and then returns the corresponding password for the e-mail address. At step 622, the forgot password process 620 then e-mails the member at the e-mail address selected the valid password corresponding to that e-mail address.

Figure 28:
FIG. 28 is a flowchart illustrating the preferred functionality of the e-mail list process utilized by the real estate auction system of the present invention, as shown in FIGS. 1B, 2A and 2B.

As illustrated in FIG. 28 is a flowchart illustrating the preferred functionality of the e-mail list process utilized by the real estate auction system of the present invention, as shown in FIGS. 1B, 2A and 2B. As illustrated in FIG. 28 is a flowchart illustrating the preferred functionality of the e-mail list process 640 utilized by the real estate auction system of the present invention, as shown in FIGS. 1B, 2A and 2B. The e-mail list process 640 enables a user to add or delete their names from the mailing list for information about the real estate auction system of the present invention. By a user adding their name to the mailing list, they will be notified about news, special deals and other exciting developments with regard to the real estate auction system 40.

First, the user proceeds to the e-mail list process 640 at step 641. After entering the user's e-mail address, they indicate whether or not they wish to be added or deleted from the mailing list. After providing their e-mail address and function preference selection, then the data is submitted to the e-mail list process 640 for processing. After performing the selected e-mail function, the user is then connected to the registration page at step 642. The registration page is herein defined above in further detail with regard to FIG. 11.

Figure 29:
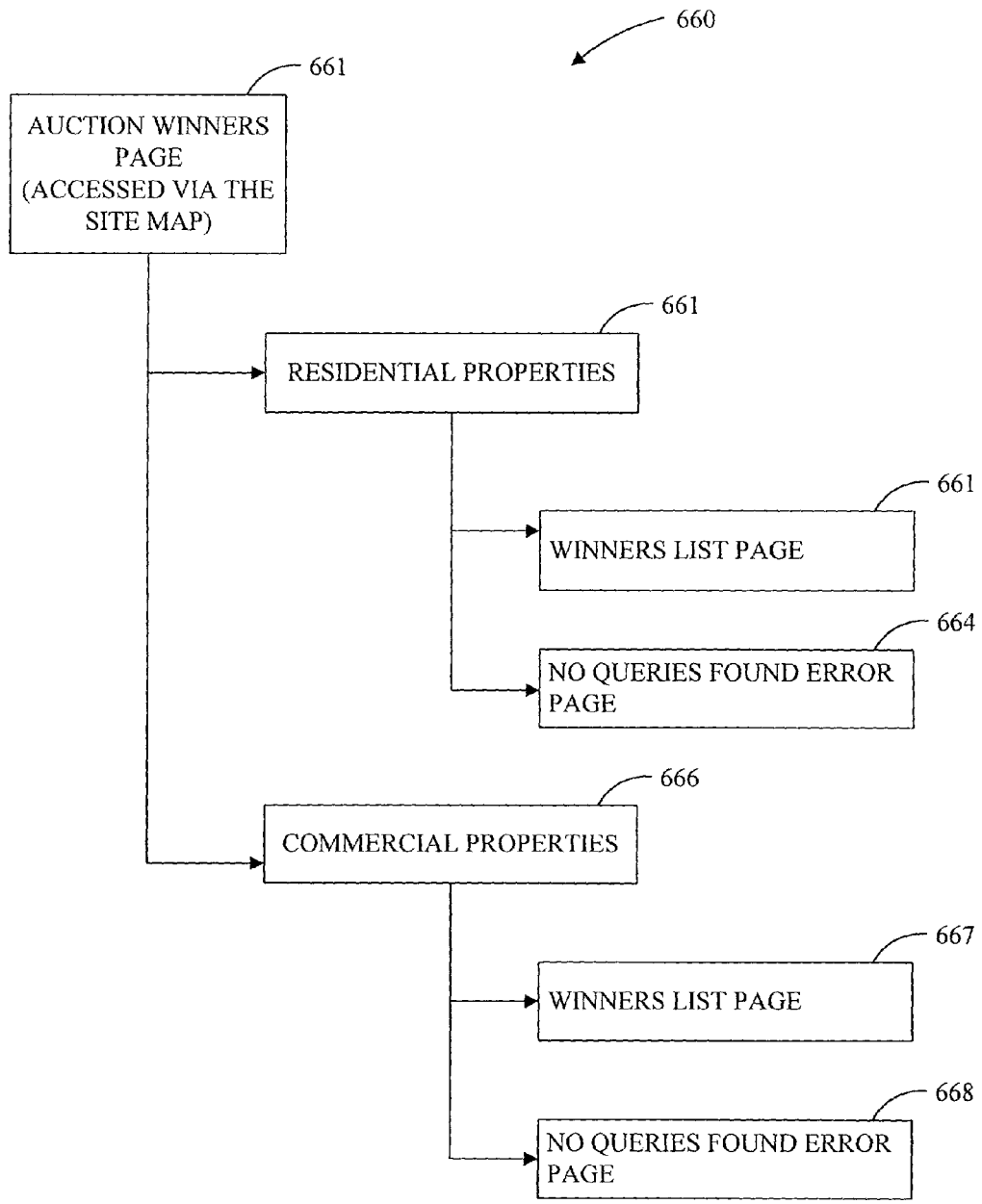
FIG. 29 is a flowchart illustrating the preferred functionality of the auction winners process utilized by the real estate auction system of the present invention, as shown in FIGS. 1B, 2A and 2B.

As illustrated in FIG. 29 is a flowchart illustrating the preferred functionality of the auction winners process utilized by the real estate auction system of the present invention, as shown in FIGS. 1B, 2A and 2B. As illustrated in FIG. 29 is a flowchart illustrating the preferred functionality of the auction winners process 660 utilized by the real estate auction system of the present invention, as shown in FIGS. 1B, 2A and 2B. The auction winners process 660 is the functionality that lists those auction winners for commercial and residential properties.

First, the auction winners process 660 determines if the user wishes to view residential or commercial properties at step 601. If it is determined at step 601 that the user wishes to view residential properties, the auction winners process 660 proceeds to step 662 to display the real estate properties query page. Upon the user indicating the appropriate particular property or location of properties the auction winners are listed at step 663. If it is determined at step 662 that there are no queries to indicate the particular group of auction winners, then the auction winners process 660 returns an error page indicating that no queries were found at step 664.

However, if it is determined at step 601 that the user wishes to access the commercial property auction winners then the auction winners process 660 proceeds to step 666. At step 666, the user indicates the property or location of commercial properties for the auction winners list to be displayed. After indicating the appropriate auction winner groupings, the winners of the selected groupings are displayed at step 667. There are also emails giving the winner and the seller personal information is sent to each other so that they can close the real estate deal once the winning bid has been verified. However, if it is determined at step 666 that there is no appropriate group or no query was inputted then the error page is displayed at step 668.

Figure 30:
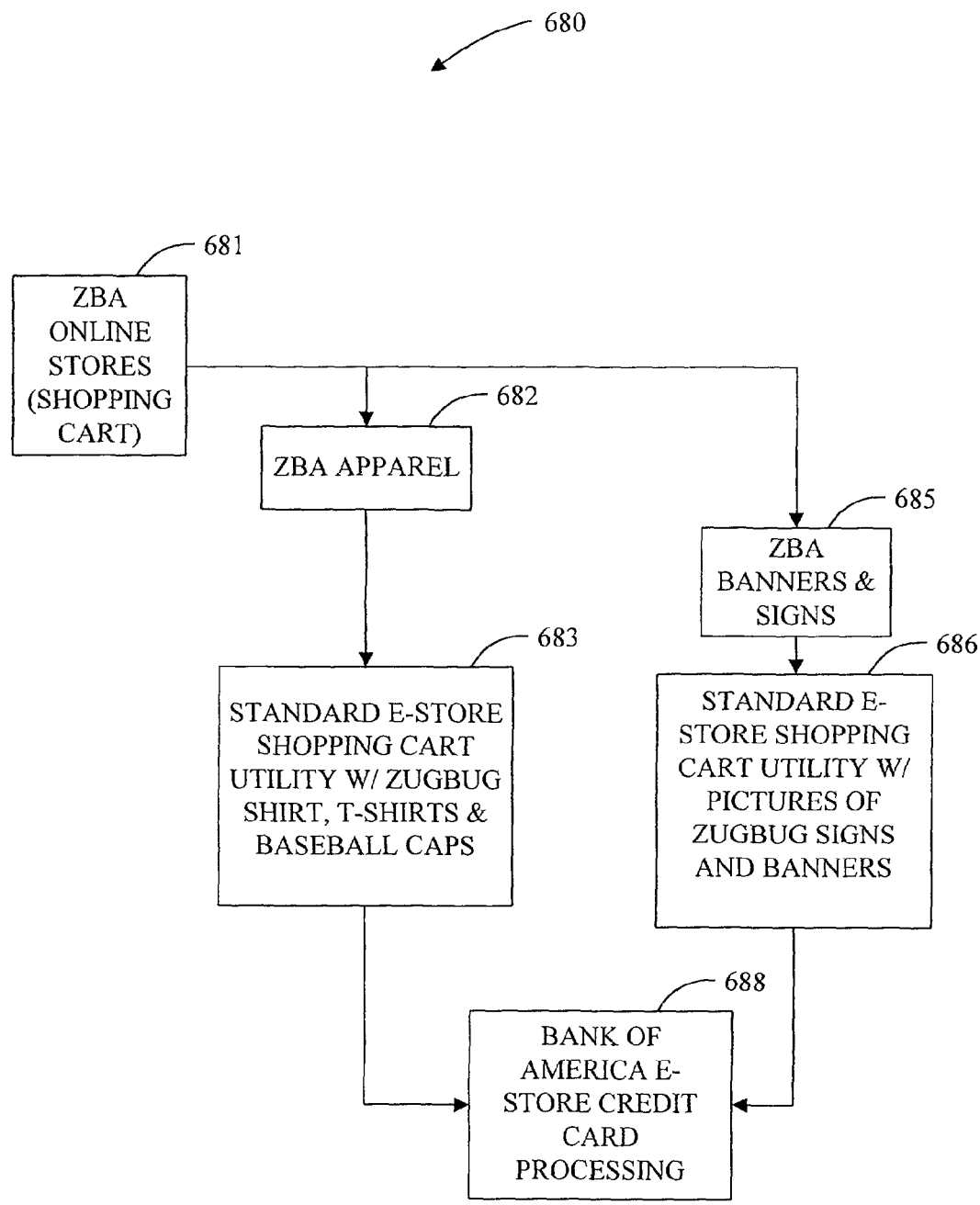
FIG. 30 is a flowchart illustrating the preferred functionality of the on-line stores process utilized by the real estate auction system of the present invention, as shown in FIGS. 1B, 2A and 2B.

As illustrated in FIG. 30 is a flowchart illustrating the preferred functionality of the on-line stores process utilized by the real estate auction system of the present invention, as shown in FIGS. 1B, 2A and 2B. As illustrated in FIG. 30 is a flowchart illustrating the preferred functionality of the on-line stores process 680 utilized by the real estate auction system of the present invention, as shown in FIGS. 1B, 2A and 2B. The on-line stores process 680 enables a user to access listings of real estate auction system apparel and items.

At step 681, the on-line stores process is entered and determines whether or not the user wishes to view apparel or banners and signs. If it is determined at step 681 that the user wishes to view available apparel, then the on-line stores process 680 proceeds to step 682 which displays the available apparel. At step 683, the user utilizes a standard shopping cart functionality to indicate the apparel to be purchased. After completing the creation of the shopping cart, the user proceeds to step 688 for the financial processing and completes the purchasing of the apparel selected. While the disclosure denotes that the Bank of America E-Store Credit Card processing is the form, the inventors contemplate that any type of internet financing available could be utilized.

However, if it is determined at step 681 that the user wishes to view the banners and signs, then the on-line stores process 680 proceeds to step 685 and displays the available banners and signs. At step 686, the user can utilize a shopping cart utility to identify the pictures of the signs and banners desired. After the user has completed his selections at step 686, the user proceeds to step 688, which is processed as described above.

Figure 31:
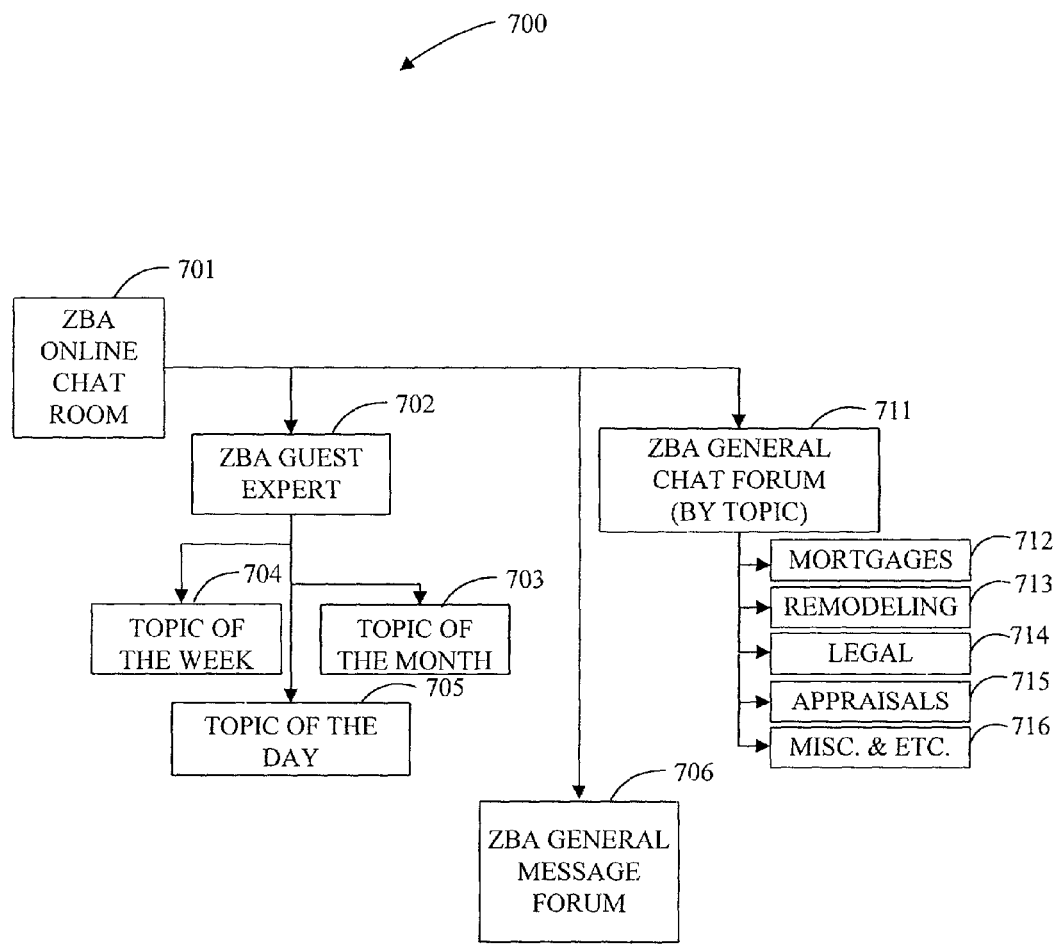
FIG. 31 is a flowchart illustrating the preferred functionality of the on-line chat process utilized by the real estate auction system of the present invention, as shown in FIGS. 1B, 2A and 2B.

As illustrated in FIG. 31 is a flowchart illustrating the preferred functionality of the on-line chat process utilized by the real estate auction system of the present invention, as shown in FIGS. 1B, 2A and 2B. The on-line chat process 700 provides for the functionality to enable a user or member to communicate with other members or to obtain general information utilizing the real estate auction system of the present invention.

The on-line chat process 700 is entered at step 701 and then determines the appropriate forum that the user wishes to utilize. If it is determined at step 701 that the user wishes to access information from a guest expert then the on-line chat process 700 proceeds to step 702. At step 702, the on-line chat process 700 enables the user or member to select the topics of guest experts provided by indicating the desired month, week or day. After the user selects the appropriate topics to be viewed at step 702, then the user proceeds to step 703 to observe the topic of the month, step 704 to observe the topic of the week, or step 705 to observe the topic of the day.

However, if it is determined at step 701 that the user or member wishes to access the general message forum, then the on-line chat process 700 proceeds to step 705 and connects the user to the general message forum.

However, if it is determined at step 701 that the user wishes to enter into a general chat by topic then the on-line chat process 700 proceeds to step 711 to connect the user to the desired chat forum by topic. At step 711, the on-line chat process determines the desired topic and connects the user to the appropriate selected topic. The selected topics include, but are not limited to, mortgages at step 712, remodeling at step 713, legal topics at step 714, appraisals at step 715, or miscellaneous topics at step 716.

Figure 32:
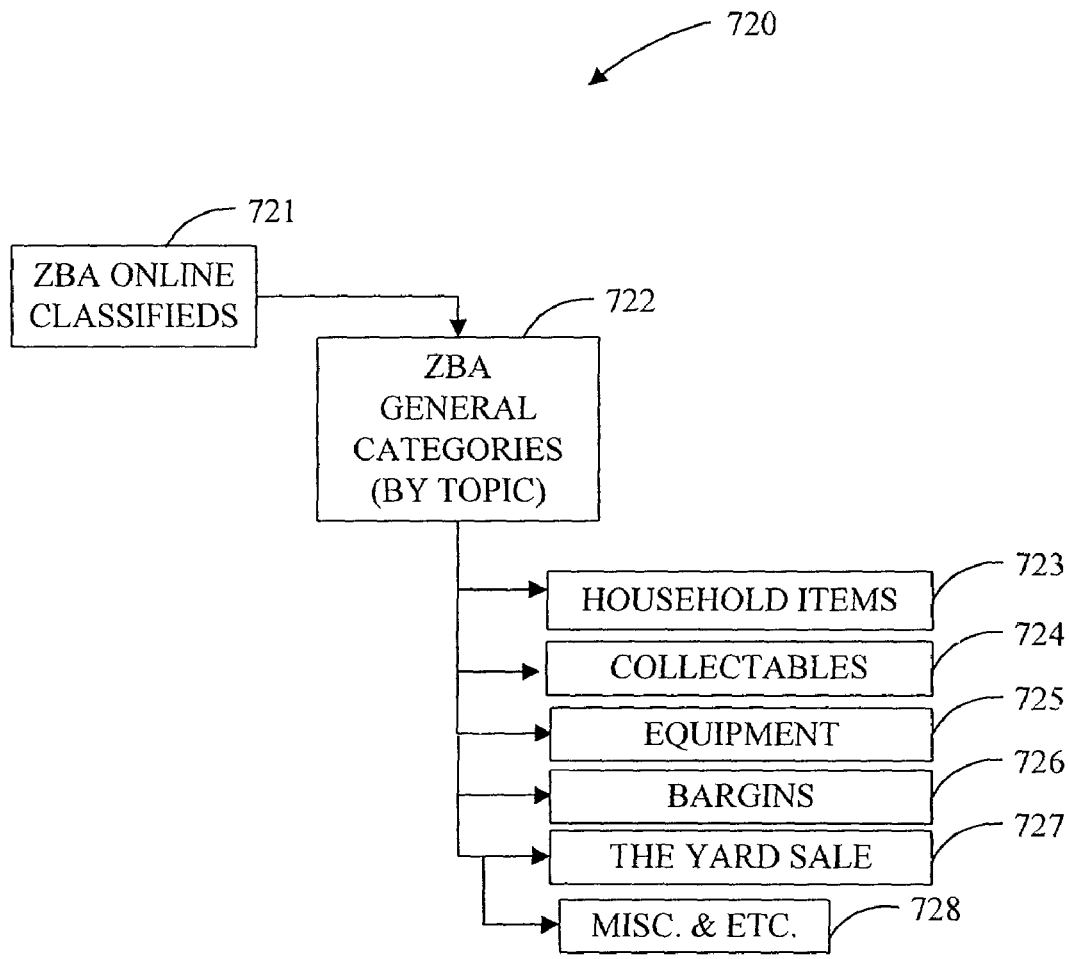
FIG. 32 is a flowchart illustrating the preferred functionality of the on-line classifieds process utilized by the real estate auction system of the present invention, as shown in FIGS. 1B, 2A and 2B.

As illustrated in FIG. 32 is a flowchart illustrating the preferred functionality of the on-line classifieds process 720 utilized by the real estate auction system of the present invention, as shown in FIGS. 1B, 2A and 2B. The online classified process 720 enables the user to access classified ads placed within the real estate auction system of the present invention.

First the user enters the online classified process at 721. At step 722, the online classified process 720 determines the desired topic or category the user desires. After the user indicates or selects the appropriate category by topic, then the online classified process 720 connects the user to the selected groups of classifieds as indicated at step 722. The categories of classifieds include, but are not limited to, household items at step 723, collectibles at step 724, equipment at step 725, bargains at step 726, yard sales at step 727 or miscellaneous items at step 728.

Figure 33A:
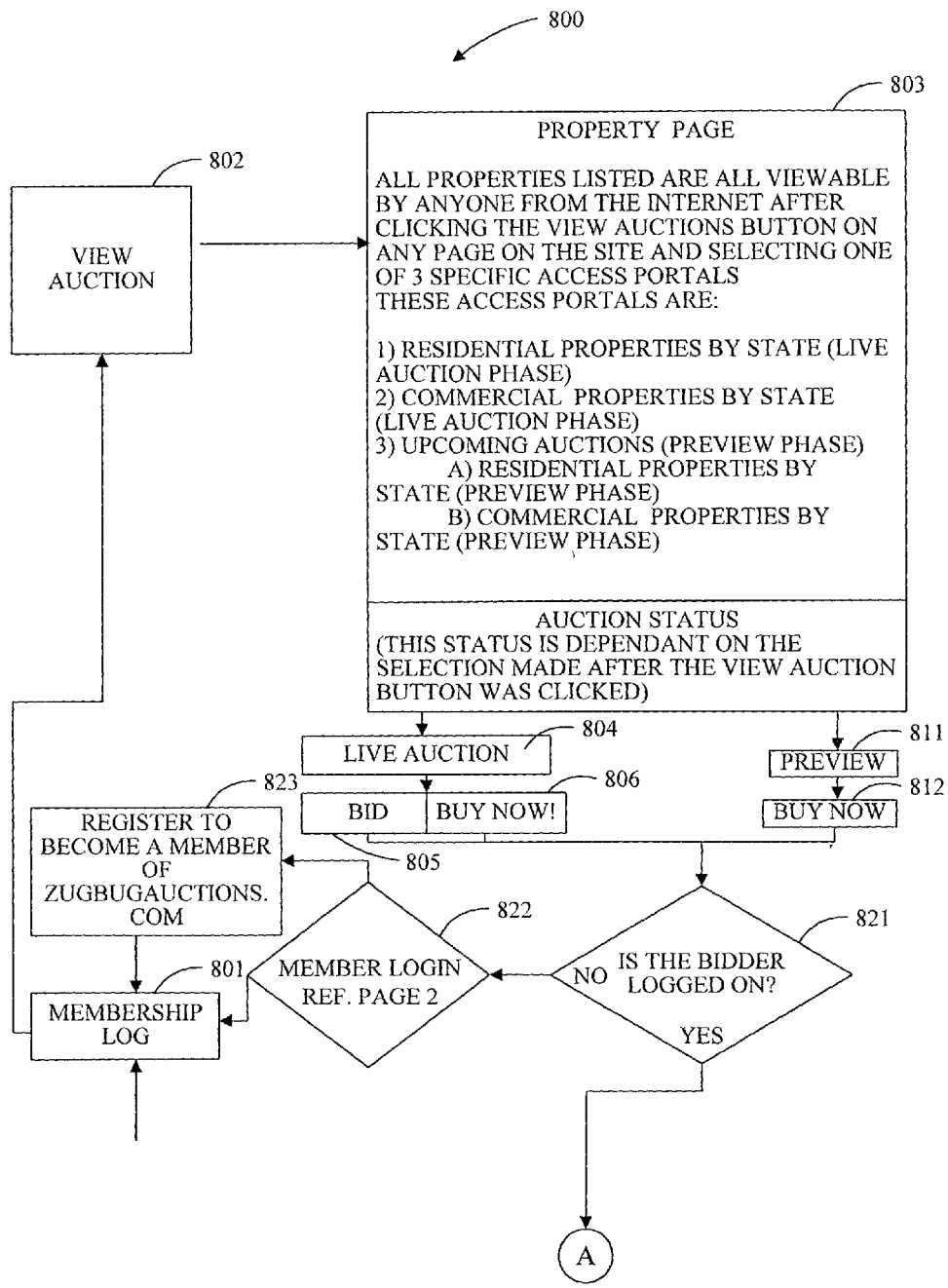
FIGS. 33A and 33B are flowcharts illustrating the preferred functionality of the buy now process utilized by the real estate auction system of the present invention, as shown in FIGS. 1B, 2A and 2B.
Figure 33B:
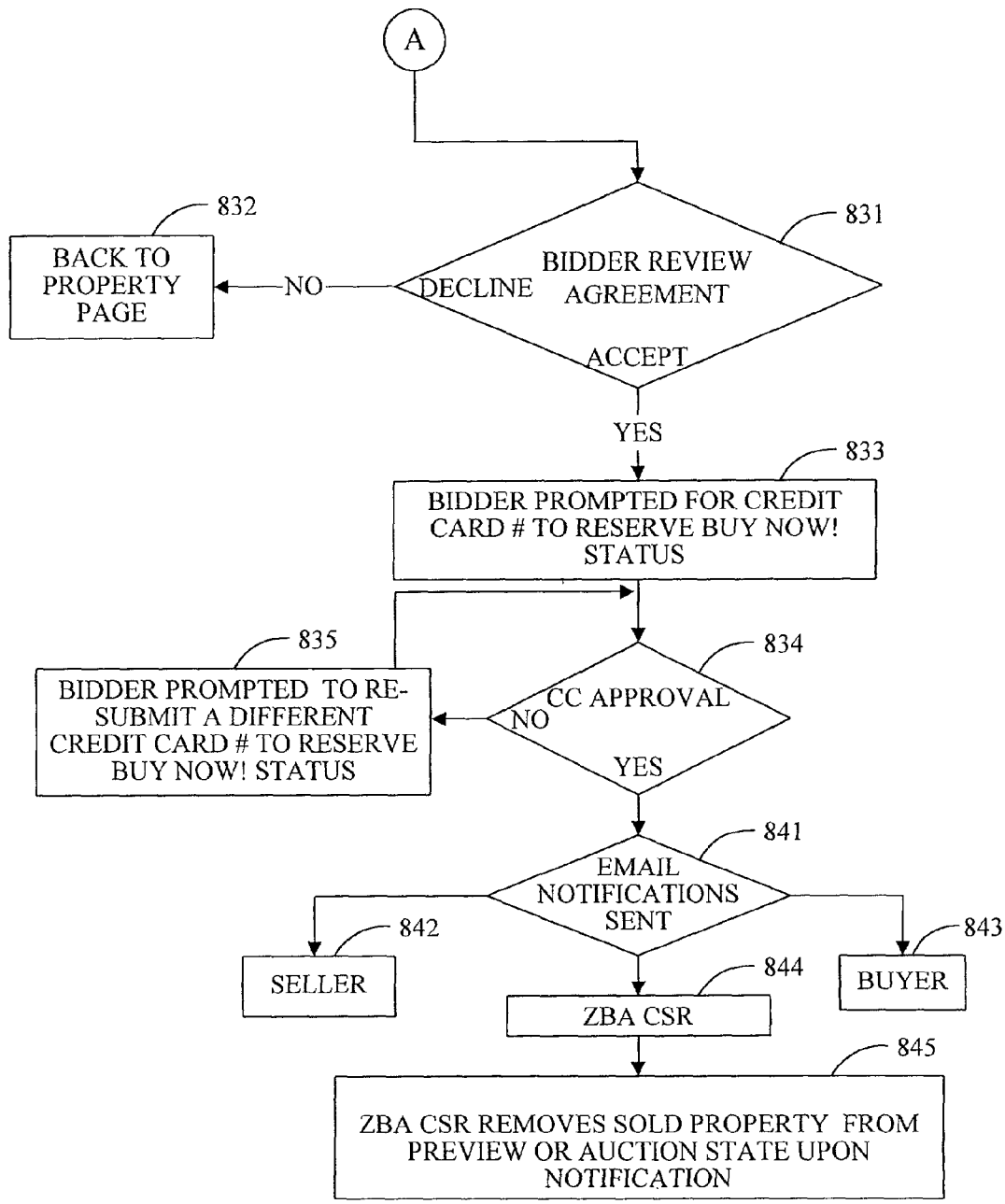

Illustrated in FIGS. 33A & B are flowcharts demonstrating the preferred functionality of the buy now process 800 utilized by the real estate auction system of the present invention, as shown in FIGS. 1B, 2A and 2B. The buy now process 800 allows any user that has logged into view residential and commercial properties that are currently accepting bids. The buy now process 800 enables a user or bidder to either submit a bid during an auction or to accept the stated selling price for a particular item and, thus buying the property right now. Upon agreeing to pay the stated selling price, the buy now process 800 then the bidding can be preempted or closed and thus taken off the auction.

First, upon approval of the new member they login to the site at step 801. In an alternative embodiment, users need not login to view properties up for auction. After performing the membership login, the user is then allowed to view properties up for auction at step 802. After selecting the properties that a user wishes to view, the user then lists all the properties viewable as selected at step 803. The properties that the user can select from are residential properties by state and commercial properties by state that are both in the live auction phase, or upcoming auctions for both residential properties and commercial properties by state. The auction status of the property that a user wishes to place a bid on is determined by whether it is in upcoming or in live phase.

If it is determined at step 803 that the current property that the user wishes to place a bid in live auction, then the buy now process 800 proceeds to step 804 to determine whether or not the user wishes to place a auction bid, or wishes to accept the stated price and, buy the property now. If the user selects the bid option then they continue on to the auction and the buy now feature is no longer available to the user or any other user if the bid is accepted on this property. If the user picks the buy now button then they go to the contract page that states the user is buying the property at a predetermined price and pay a down payment with credit card. At that time, a customer service representative will terminate the auction upon payment approval. If payment approval is not approved then the auction and buy now choices remain until one has been accepted. If it is determined at step 804 that the user wishes to place a bid which is under the buy now price, then the buy now process 800 proceeds to step 805 in order to allow the user to submit a bid. However, if it is determined at step 804 that the user wishes to accept this required buy now price, then the user proceeds to step 806. After determining the appropriate bid amount or accepting the stated price at steps 805 and 806, the buy now process 800 then determines if the bidder is logged into the auction process at step 821. If it is determined that the bidder is not logged into the process, then the buy now process 800 proceeds to step 822 then requests that the member re-login.

However, if it is determined at step 803 that the auction status of the property is not current, then any bid the user wishes to submit is previewed at step 811 to determine whether or not the submitted bid is at the stated requested buy now amount. If the user wishes to complete the bid at the buy now price, then the user proceeds to step 812 and completes the buy now process before proceeding to step 821. If it is determined at step 822 that the user is a current member, then the user proceeds to step 801 to complete the user login. However, if it is determined at step 822 that the user is not a current member, then the buy now process 800 forwards the user to the registration page in order to become a member of the real estate auction system 40 at step 283. After registering and becoming a member, the member is then directed towards membership login at step 801.

After determining that the user is logged in at step 821, the buy now process 800 then reviews the seller's agreement at step 831. The bidder, after reviewing the agreement, declines to accept the agreement then the bidder indicates that at step 831 and proceeds to step 832 to go back to the property page. However, if it is determined at step 831 that the user does accept the seller's agreement, then the buy now process 800 proceeds to step 833 to prompt the bidder for a credit card number to reserve the buy now status.

At step 834, the buy now process 800 then determines if the credit card number and transaction was approved. If it is determined at step 834 that the credit card transaction was not approved, then the buy now process 800 proceeds to step 835 to prompt the user to resubmit a different credit card to reserve the buy now status. After the user resubmits a different credit card number to reserve the buy now status, the buy now process 800 returns to repeat step 834. However, if it is determined at step 834 that the credit card transaction was approved, then the buy now process 800 proceeds to step 841 to send the email notifications of the buy now completed transaction.

The email notifications are sent to the seller at step 842, the buyer at step 843, and to customer service department for the real estate auction system 40, at step 844.

After receiving the email notification that a property has been purchase through the buy now process 800, then the customer service representative at the real estate auction system 40 then removes the property from the preview or auction state upon notification.

While particular embodiments of the invention have been disclosed in detail in the foregoing description and drawings for purposes of example, it will be understood by those skilled in the art that variations and modifications thereof can be made without departing from the scope of the invention as set forth in the following claims.

The invention claimed is:

1. A method performed by a computer for providing an on-line real estate auction service and an on-line property listing service, the method comprising the steps of:
   registering, by the computer, a seller of a real estate property who is not represented by a third party real estate agent;
   receiving, by the computer, property description data items describing the real estate property;
   receiving by the computer a user instruction indicating that the property description data items are to be posted;
   posting by the computer the property description data items for viewing, responsive to the user instruction;
   receiving by the computer a user indication of a posting type as one of an on-line auction, an on-line property listing, and a combination of both the on-line auction and the on-line property listing;
   determining by the computer a type of the posting based on the user indication of the posting type;
   responsive to the determination of the type of the posting as an on-line auction, providing by the computer at least a portion of the property description data items in connection with an on-line auction;
   responsive to the determination of the type of the posting as an on-line property listing, providing by the computer at least a portion of the property description data items describing the real estate property in connection with an on-line listing service;
   responsive to the determination of the type of the posting as both the on-line auction and the online property listing, providing, by the computer to the at least one potential buyer, at least a portion of the property description data items describing the real estate property through both the auction service and the on-line listing service;
   registering, by the computer, a plurality of potential buyers of the real estate property, wherein at least one of the plurality of potential buyers is not represented by a real estate agent; and
   responsive to the determination of the type of the posting as the on-line auction service, the computer accepting a plurality of auction bids on the real estate property from at least a portion of the plurality of potential buyers during a predetermined period and mediating the auction to produce a selection of one of the plurality of auction bids as a winning bid.

2. The method of claim 1, further comprising the step of:
   providing service tools to the at least one potential buyer, the service tools assisting the at least one potential buyer in submitting a bid on the real estate property available in the on-line auction.

3. The method of claim 1, further comprising the step of:
   receiving registration information for one of the plurality of potential buyers, the registration information including notification information;
   receiving a plurality of property search parameters and a search time period;
   during the search time period, searching real estate properties posted to the on-line auction service for properties matching the property search parameters; and
   notifying the one of the plurality of potential buyers, using the notification information, of any matches found during the search.

4. The method of claim 1, further comprising the step of:
   receiving an instruction from one of the plurality of potential buyers to accept a stated selling price associated with the real estate property rather than making an auction bid; and responsive to the instruction, refusing to accept auction bids on the real estate property from the remaining ones of the plurality of potential buyers.

5. The method of claim 1, further comprising the step of:
accepting a credit card payment from the one potential buyer among the plurality of potential buyers that has the highest bid for the real estate property.

6. The method of claim 1, further comprising the steps of:
determining a seller fee amount based on a number of real estate properties which the seller has posted to the on-line auction service in another predetermined time period; and
charging the determined seller fee amount to the seller for the posting.

7. The method of claim 1, wherein the predetermined period is a rolling 6-month period including two weeks preview and two weeks live auction.

8. The method of claim 1, further comprising:
receiving an agreement regulating the auction of the real estate property from the registered seller.

9. The method of claim 8, further comprising the step of:
validating the plurality of data items describing the real estate property for auction.

10. The method of claim 8, wherein the plurality of data items are selected from the group consisting of auction type data, property description type data, seller information type data, property utility type data and property image type data.

11. The method of claim 8, further comprising the step of:
receiving an agreement that regulates the auction of the real estate property.

12. The method of claim 8, further comprising the step of:
displaying a description of the real estate property for auction to the at least one potential buyer.

13. The method of claim 8, further comprising the step of:
providing service tools to the at least one potential buyer, the service tools assisting the at least one potential buyer in submitting a bid on the real estate property available in the on-line auction.

14. The method of claim 8, further comprising the step of:
terminating the accepting step after the predetermined period when the bid exceeds a predetermined amount; and
extending the accepting step for a second predetermined period after the predetermined period when the bid does not exceed the predetermined amount.

15. The method of claim 8, further comprising:
receiving registration information for one of the potential buyers, the registration information including notification information;
receiving a plurality of property search parameters and a search time period;
searching real estate properties posted to the on-line auction service for properties matching the property search parameters during the search time period; and
notifying the potential buyer, using the notification information, of any matches found during the search.

16. The method of claim 8, further comprising:
receiving an instruction from one of the potential buyers to accept a stated selling price associated with the real estate property rather than making a bid; and
responsive to the instruction, refusing to accept auction bids on the real estate property from the remaining potential buyers in the plurality.

17. The method of claim 8, further comprising:
accepting a credit card payment from the potential buyer when the potential buyer has the highest bid for the real estate property.

18. The method of claim 8, further comprising:
determining a fee amount based on a number of real estate properties which the seller has posted to the on-line auction service in a predetermined time period; and
charging the determined fee amount to the seller for the posting.

19. The method of claim 1, further comprising:
terminating the accepting step after the predetermined period when the bid exceeds a predetermined amount; and
extending the accepting step for a second predetermined period after the predetermined period when the bid does not exceed the predetermined amount.

20. The method of claim 1, further comprising:
providing by the computer a seller's agreement regulating the auction of the real estate property; and
receiving by the computer the seller's agreement as executed by the seller.

21. The method of claim 1, further comprising:
notifying by the computer the at least one potential buyer of a stated selling price for the real estate property;
receiving, by the computer, an acceptance from the at least one potential buyer of the stated selling price for the real estate property; and
responsive to the acceptance of the stated selling price, the computer refusing to accept additional auction bids on the real estate property.

22. A non-transitory computer readable medium having a program including instructions executable by a computer to provide an on-line real estate auction service and an on-line property listing service, said program comprising:
logic for registering a seller of a real estate property who is not represented by a real estate agent;
logic for registering a seller of a real estate property;
logic for receiving property description data items describing the real estate property;
logic for receiving a user instruction indicating that the property description data items are to be posted;
logic for posting the real estate property for viewing, responsive to the user instruction;
logic for receiving a user indication of a posting type as one of an on-line auction, an on-line property listing, and a combination of both the on-line auction and the on-line property listing;
logic for determining a type of the posting based on the user indication of the posting type;
logic for providing, to a potential buyer, at least a portion of the property description data items describing the real estate property through an on-line auction service, responsive to the determination of the type of the posting as an on-line auction;
logic for displaying, to the potential buyer, at least a portion of the property description data items in connection with an on-line listing service, responsive to the determination of the type of the posting as an on-line property listing,
logic for displaying, to the potential buyer, at least a portion of the property description data items in connection with both the auction service and the on-line listing service, responsive to the determination of the type of the posting as both the on-line auction and the online property listing;
logic for registering, by the computer, a plurality of potential buyers of the real estate property, wherein at least one of the plurality of potential buyers is not represented by a real estate agent; and logic for accepting, responsive to the determination of the type of the posting as the on-line auction service, a plurality of auction bids on the real estate property from at least a portion of the plurality of potential buyers during a predetermined period and for mediating the auction to select one of the plurality of auction bids as a winning bid.

23. The non-transitory computer readable medium of claim 22, further comprising:
logic for terminating the accepting step after the predetermined period when the bid exceeds a predetermined amount; and
logic for extending the accepting step for a second predetermined period after the predetermined period when the bid does not exceed the predetermined amount.

24. The non-transitory computer readable medium of claim 22, further comprising:
logic for receiving registration information for one of the plurality of potential buyers, the registration information including notification information;
logic for receiving a plurality of property search parameters and a search time period;
logic for, searching property description data items posted to the on-line auction service for properties matching the property search parameters during the search time period; and
logic for notifying the one of the plurality of potential buyers, using the notification information, of any matches found during the search.

25. The non-transitory computer readable medium of claim 22, further comprising:
logic for receiving an instruction from one of the plurality of potential buyers to accept a stated selling price associated with the real estate property rather than making a bid; and
logic for responsive to the instruction, refusing to accept auction bids on the real estate property from the remaining ones of the plurality of potential buyers in the plurality.

26. The non-transitory computer readable medium of claim 22, further comprising:
logic for accepting a credit card payment from one of the potential buyers the one potential buyer has the highest bid for the real estate property.

27. The non-transitory computer readable medium of claim 22, further comprising:
logic for determining a seller fee amount based on a number of real estate properties which the seller has posted to the on-line auction service in a predetermined time period; and
logic for charging the determined seller fee amount to the seller for the posting.

28. The non-transitory computer readable medium of claim 22, wherein the predetermined period is a rolling 6-month period including two weeks preview and two weeks live auction.

29. A system for providing an on-line real estate auction service and an on-line real estate listing service, the system comprising:
means for registering a seller of a real estate property who is not legally represented by a real estate agent;
means for receiving property description data items describing the real estate property;
means for receiving a user instruction indicating that the property description data items are to be posted;
means for posting the real estate property for viewing, responsive to the user instruction;
means for receiving a user indication of a posting type as one of an on-line auction, an on-line property listing, and a combination of both the on-line auction and the on-line property listing;
means for determining a type of the posting based on the user indication of the posting type;
means for providing, to a potential buyer, at least a portion of the property description data items describing the real estate property through an on-line auction service, responsive to the determination of the type of the posting as an on-line auction;
means for providing, to the potential buyer, at least a portion of the property description data items in connection with an on-line listing service, responsive to the determination of the type of the posting as an on-line property listing, means for providing, to the potential buyer, at least a portion of the property description data items in connection with both the auction service and the on-line listing service, responsive to the determination of the type of the posting as both the on-line auction and the online property listing;
means for registering a plurality of potential buyers of the real estate property, wherein at least one of the plurality of potential buyers is not represented by a real estate agent; and
means for accepting, responsive to the determination of the type of the posting as the on-line auction service, a plurality of auction bids on the real estate property from at least a portion of the plurality of potential buyers during a predetermined period and for mediating the auction in order to select one of the plurality of auction bids as a winning bid.

30. The system of claim 29, further comprising:
means for accepting, from the registered seller, an agreement regulating the online auction of the real estate property.

31. The system of claim 29, further comprising:
means for receiving registration information for one of the plurality of potential buyers, the registration information including notification information;
means for receiving a plurality of property search parameters and a search time period;
means for, searching property description data items posted to the on-line auction service for properties matching the property search parameters during the search time period; and
means for notifying the one of the plurality of potential buyers, using the notification information, of any matches found during the search.

32. The system of claim 29, further comprising:
means for receiving an instruction from one of the plurality of potential buyers to accept a stated selling price associated with the real estate property rather than making a bid; and
means for responsive to the instruction, refusing to accept auction bids on the real estate property from the remaining ones of the plurality of potential buyers in the plurality.

33. The system of claim 29, further comprising:
means for accepting a credit card payment from one of the potential buyers the one potential buyer has the highest bid for the real estate property.

34. The system of claim 29, further comprising:
means for determining a seller fee amount based on a number of real estate properties which the seller has posted to the on-line auction service in a predetermined time period; and
means for charging the determined seller fee amount to the seller for the posting.

35. The system of claim 29, wherein the predetermined period is a rolling 6-month period including two weeks preview and two weeks live auction.

36. The system of claim 29, further comprising:
means for terminating the accepting step after the predetermined period when the bid exceeds a predetermined amount; and
means for extending the accepting step for a second predetermined period after the predetermined period when the bid does not exceed the predetermined amount.

* * * * *